US011668567B2

(12) United States Patent
Yuasa

(10) Patent No.: US 11,668,567 B2
(45) Date of Patent: Jun. 6, 2023

(54) SURVEYING INSTRUMENT

(71) Applicant: TOPCON Corporation, Tokyo-to (JP)

(72) Inventor: Taichi Yuasa, Tokyo-to (JP)

(73) Assignee: TOPCON Corporation, Tokyo (JP)

( * ) Notice: Subject to any disclaimer, the term of this patent is extended or adjusted under 35 U.S.C. 154(b) by 286 days.

(21) Appl. No.: 17/114,913

(22) Filed: Dec. 8, 2020

(65) Prior Publication Data

US 2021/0190493 A1 Jun. 24, 2021

(30) Foreign Application Priority Data

Dec. 24, 2019 (JP) .............................. JP2019-232457

(51) Int. Cl.
*G01C 15/02* (2006.01)
*G01C 3/08* (2006.01)

(52) U.S. Cl.
CPC ............... *G01C 15/02* (2013.01); *G01C 3/08* (2013.01)

(58) Field of Classification Search
CPC .......... G01C 15/002; G01C 1/02; G01C 1/04; G01C 15/00; G01C 3/08; G01C 11/025; G01C 15/02; G01C 11/06; G01C 15/004; G01C 15/006; G01C 15/04; G01C 11/02; G01C 25/00; G01C 3/18; G01C 11/04; G01C 3/02; G01C 15/06; G01C 3/04; G01C 11/00; G01C 15/008; G01C 3/00; G01C 15/105

See application file for complete search history.

(56) References Cited

U.S. PATENT DOCUMENTS

| | | | | |
|---|---|---|---|---|
| 5,936,736 A | * | 8/1999 | Suzuki ................. | G01B 11/026 356/624 |
| 2012/0113409 A1 | * | 5/2012 | Yamada ................... | G01C 3/08 356/5.01 |
| 2017/0045748 A1 | | 2/2017 | Sugiura | |
| 2018/0292514 A1 | | 10/2018 | Yoshino | |

(Continued)

FOREIGN PATENT DOCUMENTS

| | | | | | |
|---|---|---|---|---|---|
| CN | 102445194 A | * | 5/2012 | ............... | G01C 1/04 |
| DE | 19921119 B4 | * | 4/2005 | ............... | G01C 1/02 |
| EP | 3130888 A1 | * | 2/2017 | ............... | G01C 1/02 |

(Continued)

OTHER PUBLICATIONS

European communication dated May 25, 2021 in corresponding European patent application No. 20214429.1.

*Primary Examiner* — Michael P Stafira
(74) *Attorney, Agent, or Firm* — Nields, Lemack & Frame, LLC

(57) ABSTRACT

A surveying instrument includes a distance measuring unit which irradiates an object with the distance measuring light and measures a distance to the object based on the reflected distance measuring light from the object, wherein the distance measuring unit includes a distance measuring light projecting module configured to project the distance measuring light and a distance measuring light receiving module configured to receive the reflected distance measuring light, the distance measuring light receiving module includes a dichroic prism and a light receiving module, and the dichroic prism is configured in such a manner that the reflected distance measuring light is internally reflected in the dichroic prism at least three times and then received by the light receiving module.

19 Claims, 12 Drawing Sheets

(56) References Cited

U.S. PATENT DOCUMENTS

2019/0078883 A1 * 3/2019 Yuasa ................ G02B 27/1006

FOREIGN PATENT DOCUMENTS

| EP | 3457080 A1 * | 3/2019 | ............ G01C 1/04 |
| JP | 2017037027 A * | 2/2017 | ............ G01C 1/02 |
| JP | 2018-179588 A | 11/2018 | |
| WO | 2016/039053 A1 | 3/2016 | |

* cited by examiner

SURVEYING INSTRUMENT

BACKGROUND OF THE INVENTION

The present invention relates to a surveying instrument which can acquire the three-dimensional coordinates of an object.

A surveying instrument such as a laser scanner or a total station has an electro-optical distance measurement device which detects a distance to an object by the prism distance measurement using a reflecting prism as the object or the non-prism distance measurement using no reflecting prism.

A light receiving module of the electro-optical distance measurement device has an optical system including a lens, and the incident light is imaged on a light receiving surface by a refracting action of the lens. An objective lens of the optical system has a focal distance "f", and this focal distance "f" is determined based on the performance required for the electro-optical distance measurement device. For instance, in case of performing the vertical measurement, an aperture of the lens increases to assure a light receiving amount, and a focal distance also becomes longer with an increase in aperture of the lens.

For this reason, the light receiving module of the electro-optical distance measurement device requires a size which enables accommodating the optical system and a length in an optical axis direction which enables assuring the focal distance "f". Therefore, the miniaturization of the light receiving module has been difficult due to the limitation in the size of the optical system and the focal distance.

SUMMARY OF INVENTION

It is an object of the present invention to provide a surveying instrument which miniaturizes an optical system and attains the miniaturization of the entire instrument.

To attain the object as described, a surveying instrument according to the present invention includes a distance measuring unit which irradiates an object with the distance measuring light and measures a distance to the object based on the reflected distance measuring light from the object, wherein the distance measuring unit includes a distance measuring light projecting module configured to project the distance measuring light and a distance measuring light receiving module configured to receive the reflected distance measuring light, the distance measuring light receiving module includes a dichroic prism and a light receiving module, and the dichroic prism is configured in such a manner that the reflected distance measuring light is internally reflected in the dichroic prism at least three times and then received by the light receiving module.

Further, in the surveying instrument according to a preferred embodiment, the distance measuring unit further includes a sighting module configured to sight the object, wherein the dichroic prism is configured to separate the visible light or the visible light excluding a part of a red color which has entered coaxially with the reflected distance measuring light.

Further, in the surveying instrument according to a preferred embodiment, the distance measuring unit further includes a tracking light projecting module configured to project the tracking light to the object and a tracking light receiving module configured to receive the reflected tracking light from the object, wherein the dichroic prisms is configured in such a manner that the reflected distance measuring light and the reflected tracking light are internally reflected in the dichroic prism at least three times respectively and then the reflected distance measuring light is separated from the reflected tracking light.

Further, in the surveying instrument according to a preferred embodiment, the dichroic prism includes a second prism having a surface configured to separate the visible light or the visible light excluding a part of the red color.

Further, in the surveying instrument according to a preferred embodiment, the dichroic prism includes a first prism configured to internally reflect the reflected distance measuring light and the reflected tracking light and a third prism having a separating surface configured to separate the reflected distance measuring light from the reflected tracking light.

Further, in the surveying instrument according to a preferred embodiment, the separating surface is a dichroic filter surface configured to transmit through any one of the reflected distance measuring light and the reflected tracking light and reflects the other light.

Further, in the surveying instrument according to a preferred embodiment, the separating surface is a long pass filter surface configured to change a reflectance based on an incidence angle.

Furthermore, in the surveying instrument according to a preferred embodiment, the dichroic prism further includes a color glass provided on an optical path of at least one of the reflected distance measuring light and the reflected tracking light.

According to the present invention, a surveying instrument includes a distance measuring unit which irradiates an object with the distance measuring light and measures a distance to the object based on the reflected distance measuring light from the object, wherein the distance measuring unit includes a distance measuring light projecting module configured to project the distance measuring light and a distance measuring light receiving module configured to receive the reflected distance measuring light, the distance measuring light receiving module includes a dichroic prism and a light receiving module, and the dichroic prism is configured in such a manner that the reflected distance measuring light is internally reflected in the dichroic prism at least three times and then received by the light receiving module. As a result, a length in an optical axis direction of the distance measuring light receiving module can be shortened, an optical system of the distance measuring unit can be miniaturized, and the entire surveying instrument can be miniaturized.

DESCRIPTION OF EMBODIMENTS

Figure 1:
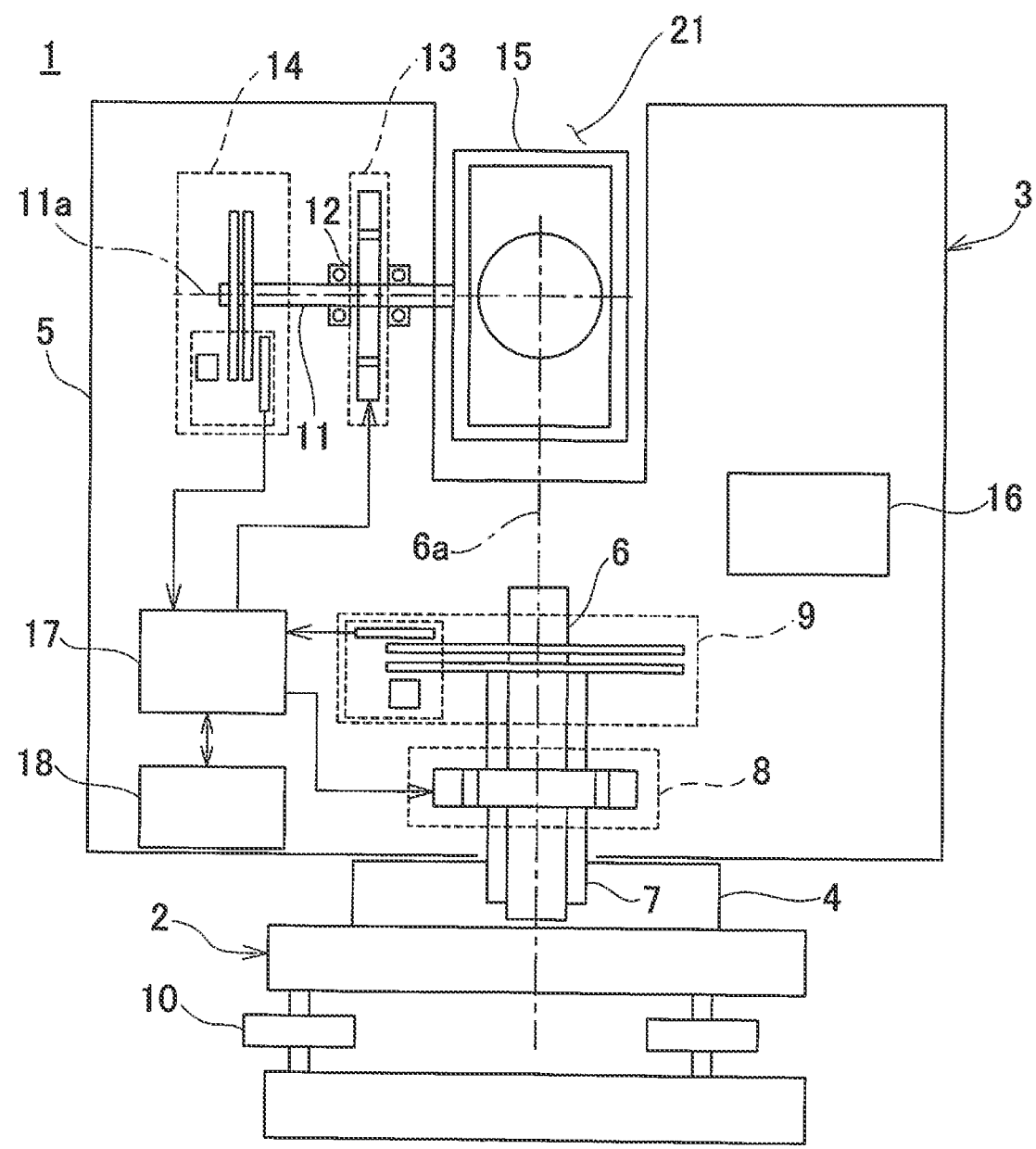
FIG. 1 is a front sectional drawing showing a surveying instrument according to a first embodiment of the present invention.

A description will be given on an embodiment of the present invention by referring to the attached drawings.

First, in FIG. 1, a description will be given on a surveying instrument according to a first embodiment of the present invention.

A surveying instrument 1 is, for instance, a total station, and constituted of a leveling module 2 mounted on a tripod (not shown) and a surveying instrument main body 3 mounted on the leveling module 2. The leveling module 2 performs a leveling by a leveling screw 10. It is to be noted that, as the measurement, the non-prism measurement is carried out.

The surveying instrument main body 3 includes a base unit 4, a frame unit 5, a horizontal rotation shaft 6, a horizontal rotation bearing 7, a horizontal rotation motor 8 as a horizontal rotation driving module, a horizontal angle encoder 9 as a horizontal angle detector, a vertical rotation shaft 11, a vertical rotation bearing 12, a vertical rotation motor 13 as a vertical rotation driving module, a vertical angle encoder 14 as a vertical angle detector, a telescope module 15 as a vertical rotation module, an operation panel 16 which serves as both an operation module and a display unit, an arithmetic control module 17, a storage module 18 and others. It is to be noted that, as the arithmetic control module 17, a CPU specialized to this instrument or a general-purpose CPU is used. The telescope module 15 also incorporates a distance measuring unit 19 (to be described later).

The horizontal rotation bearing 7 is fixed to the base unit 4. The horizontal rotation shaft 6 has a vertical axis 6a, and the horizontal rotation shaft 6 is rotatably supported by the horizontal rotation bearing 7. Further, the frame unit 5 is supported by the horizontal rotation shaft 6, and the frame unit 5 integrally rotates with the horizontal rotation shaft 6 in the horizontal direction.

The horizontal rotation motor 8 is provided between the horizontal rotation bearing 7 and the frame unit 5, and the horizontal rotation motor 8 is controlled by the arithmetic control module 17. The arithmetic control module 17 rotates the frame unit 5 around the axis 6a by the horizontal rotation motor 8.

A relative rotation angle of the frame unit 5 with respect to the base unit 4 is detected by the horizontal angle encoder 9. A detection signal from the horizontal angle encoder 9 is input to the arithmetic control module 17, and the horizontal angle data is calculated by the arithmetic control module 17. The arithmetic control module 17 performs the feedback control of the horizontal rotation motor 8 based on the horizontal angle data.

Further, in the frame unit 5, the vertical rotation shaft 11 having a horizontal axis 11a is provided. The vertical rotation shaft 11 can rotate via the vertical rotation bearing 12. It is to be noted that an intersection of the axis 6a and the axis 11a is a projecting position of the distance measuring light, and the intersection is an origin of a coordinate system of the surveying instrument main body 3.

A recess portion 21 is formed in the frame unit 5. One end portion of the vertical rotation shaft 11 extends to the inside of the recess portion 21, and the telescope module 15 is fixed to the one end portion. Therefore, the telescope module 15 is accommodated in the recess portion 21.

Further, the vertical angle encoder 14 is provided at the other end portion of the vertical rotation shaft 11. The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13, and the telescope module 15 is rotated around the axis 11a.

A rotation angle of the telescope module 15 is detected by the vertical angle encoder 14, and a detection signal is input to the arithmetic control module 17. The arithmetic control module 17 calculates the vertical angle data of the telescope module 15 based on the detection signal, and performs the feedback control of the vertical rotation motor 13 based on the vertical angle data.

Further, the horizontal angle data and the vertical angle data calculated by the arithmetic control module 17, the measurement results, the measuring point intervals (to be described later), and the measuring angle intervals (to be described later) are saved in the storage module 18. As the storage module 18, the various types of storage devices are used. These storage devices include: an HDD as a magnetic storage device, a CD or DVD as an optical storage device, a RAM, a ROM, a DRAM, a memory card and a USB memory as a semiconductor storage device and other storage devices. The storage module 18 may be attachable and detachable the frame unit 5. Alternatively, the storage module 18 may be configured to enable transmitting the data to an external storage device or an external data processing device via a non-illustrated communicating means.

In the storage module 18 are stored the various types of programs are stored. These programs include: a sequence program for controlling the distance measuring operation, a calculation program for calculating a distance by the distance measuring operation, a calculation program for calculating an angle based on the horizontal angle data and the vertical angle data, a calculation program for calculating the three-dimensional coordinates of a desired measuring point based on a distance and an angle, a tracking program for tracking an object, a setting program for setting the measurement conditions and other programs. Further, when the various types of programs stored in the storage module 18 are executed by the arithmetic control module 17, the various types of processing are performed.

The operation panel 16 is, for instance, a touch panel. The operation panel 16 serves as both an operation module which performs, for instance, changing the distance measurement instructions or the measurement conditions such as a measuring point interval or a measuring angle interval and a display unit which displays a distance measurement result and the like.

Next, a description will be given on the distance measuring unit 19 by referring to FIG. 2. It is to be noted that, in FIG. 2, only a chief lay (an optical axis) of each light is shown.

The distance measuring unit 19 mainly has a distance measuring light projecting module 22 which performs the irradiation of the distance measuring light, a distance measuring light receiving module 23 which receives the reflected distance measuring light reflected by the object (a measuring point), a tracking light projecting module 24 which performs the irradiation of the tracking light, a tracking light receiving module 25 which receives the reflected tracking light reflected by the object, a sighting module 26 which receives the visible light or the visible light excluding a part of a red color (the background light), and an internal reference light receiving module 27 which receives a part of the distance measuring light as the internal reference light. It is to be noted that the part of the red color indicates a red color close to the near-infrared, for instance, a wavelength near 650 nm to 700 nm.

The distance measuring light projecting module 22 has a projecting optical axis 28. Further, the distance measuring light projecting module 22 has a light emitter 29, a light projecting lens 31 and the mirror 32 which are provided on the projecting optical axis 28, and a reflecting prism 33 provided on a reflecting optical axis of the mirror 32. It is to be noted that, the light projecting lens 31, the mirror 32 and the reflecting prism 33 constitutes a light projecting optical system. Further, the reflecting prism 33 is attached to a window portion 30 provided in the telescope module 15.

Further, on the projecting optical axis 28, the light emitter 29, the light projecting lens 31, a beam splitter 34, a dichroic mirror 35 and the mirror 32 are provided in the mentioned order from the light emitter 29 side.

The light emitter 29 is a distance measuring light source, and the light emitter 29 is, for instance, a laser diode (LD). Further, the light emitter 29 projects a laser beam having a part of a red color or a near-infrared wavelength as the distance measuring light. Further, the mirror 32 deflects the projecting optical axis 28 at a right angle. Further, the reflecting prism 33 further deflects at a right angle the projecting optical axis 28 deflected by the mirror 32 so that the projecting optical axis 28 becomes coaxial with a light receiving optical axis 36 (to be described later).

The distance measuring light receiving module 23 has the light receiving optical axis 36. Further, the distance measuring light receiving module 23 has an objective lens 37 and a dichroic prism 38 which are provided on the light receiving optical axis 36, and a light receiving module 39 provided on a reflecting optical axis of the dichroic prism 38. It is to be noted that the objective lens 37 and the dichroic prism 38 constitute a light receiving optical system.

The objective lens 37 is configured to focus the reflected distance measuring light (to be described later), the reflected tracking light (to be described later) and the visible light (to be described later), which have entered at a given spread angle. Further, the dichroic prism 38 has a plurality of reflecting surfaces therein, and is configured to deflect the light receiving optical axis 36 toward the light receiving module 39.

Further, the light receiving module 39 is, for instance, an optical fiber, and the light receiving module 39 is configured to guide the reflected distance measuring light via the optical fiber to a non-illustrated photodetector. Alternatively, the photodetector may be directly provided in place of the optical fiber.

The tracking light projecting module 24 has a tracking light projecting optical axis 41, and a tracking light emitter 42 which is a tracking light source is provided on the tracking light projecting optical axis 41. The tracking light emitter 42 is, for instance, a laser diode (LD) which projects a laser beam having a wavelength different from that of the distance measuring light and having a part of a red color or a near-infrared wavelength. Further, on the tracking light projecting optical axis 41, a light projecting lens 43 and the dichroic mirror 35 are provided. It is to be noted that, the light projecting lens 35, the dichroic mirror 35, the mirror 32 and the reflecting prism 33 constitute a tracking light projecting optical system.

The dichroic mirror 35 has the optical characteristics which transmit through the distance measuring light and reflect the tracking light. Further, the dichroic mirror 35 deflects the tracking light projecting optical axis 41 coaxially with the projecting optical axis 28. That is, the dichroic mirror 35 is arranged at an intersecting position of the projecting optical axis 28 and the tracking light projecting optical axis 28 and is arranged on a common optical path of the distance measuring light and the tracking light.

The tracking light receiving module 25 has a tracking light receiving optical axis 44. Further, the tracking light receiving module 25 has the objective lens 37 and the dichroic prism 38 which are provided on the tracking light receiving optical axis 44, and an image pickup element 45 provided on the reflecting optical axis of the dichroic prism 38. It is to be noted that, the objective lens 37 and the dichroic prism 38 constitute a tracking light receiving optical system.

The tracking light receiving optical axis 44 is coaxial with the light receiving optical axis 36, and the tracking light receiving optical axis 44 is separated from the light receiving optical axis 36 by the dichroic prism 38 so that the tracking light receiving optical axis 44 is deflected toward the image pickup element 45.

The image pickup element 45 is a CCD or a CMOS sensor which is an aggregation of pixels, and each pixel can specify a position on the image pickup element 45. For instance, each pixel has the pixel coordinates having the center of the image pickup element 45 as an origin, and the position on the image pickup element 45 can be specified by the pixel coordinates. The receiving signal and the pixel coordinate output from each pixel are input to the arithmetic control module 17.

The sighting module 26 has a sighting optical axis 46, and the sighting optical axis 46 coincides with the light receiving optical axis 36 and the projecting optical axis 28 which is deflected by the reflecting prism 33. Further, the sighting module 26 is a sighting optical system, and has the objective lens 37, the dichroic prism 38, the focusing lens 47, an erecting prism 48, a reticle 49 and an ocular lens 51 which are provided on the sighting optical axis 46.

A worker can focus via the sighting module 26, convert an inverted image into an erected image, and direct the sighting optical axis 46 toward an arbitrary object.

The internal reference light receiving module 27 has the internal reference optical axis 52. Further, the internal reference light receiving module 27 has the beam splitter 34, a receiving light lens 53, the reference light receiving modules 54, for instance, the light receiving fibers, a reference light imaging lens 55, and the dichroic prism 38 which are provided on the internal reference optical axis 52.

Figure 2:
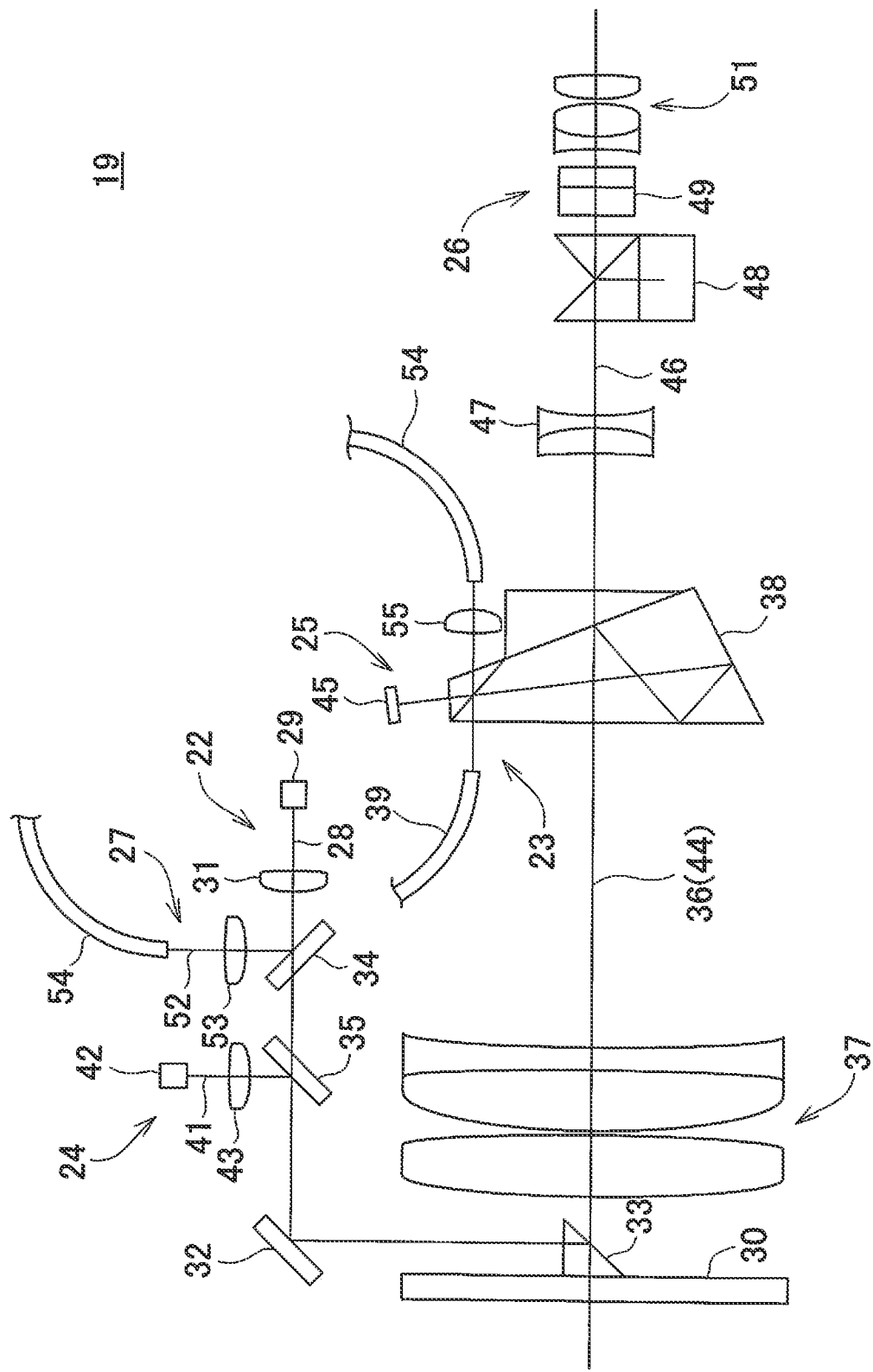
FIG. 2 is a block diagram showing a distance measuring unit of the surveying instrument according to the first embodiment of the present invention.

It is to be noted that, in FIG. 2, the reference light receiving modules 54, 54 are illustrated as the separate members, but the reference light receiving modules 54, 54 are the same members. It is to be noted that, the beam splitter 34, the receiving light lens 53, the reference light receiving modules 54, the reference light imaging lens 55, and the dichroic prism 38 constitute an internal reference light optical system.

The beam splitter 34 has, for instance, the optical characteristics to reflect the light which is approximately 1% and transmit through the light which is approximately 99%, and separates a part of the distance measuring light as the internal reference light. Further, the beam splitter 34 deflects the projecting optical axis 28 coaxially with the internal reference optical axis 52. That is, the beam splitter 34 is arranged at an intersecting position of the projecting optical axis 28 and the internal reference optical axis 52 and is arranged on a common optical path of the distance measuring light and the internal reference light.

Next, in FIG. 3, a description will be given on the detail of the dichroic prism 38. In the following description, the reflected distance measuring light, the reflected tracking light and the visible light are also collectively referred to as a chief lay.

The dichroic prism 38 has a configuration in which a first prism 56 which is a square prism having a predetermined refractive index, a second prism 57 which is a triangular prism having a predetermined refractive index, and a third prism 58 which is a triangular prism having a predetermined refractive index are integrated.

Figure 3:
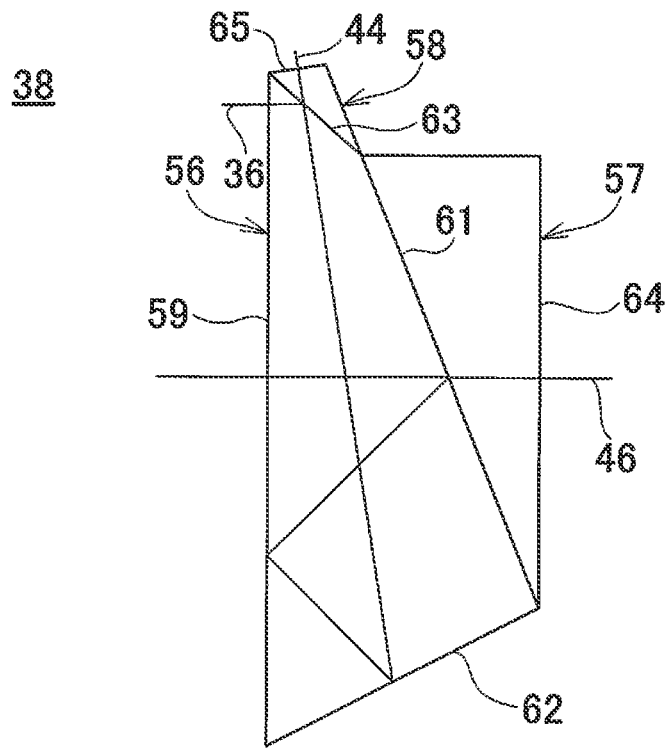
FIG. 3 is a block diagram showing a dichroic prism of the distance measuring unit according to the first embodiment of the present invention.

The first prism 56 has a first surface 59 facing the objective lens 37, a second surface 61 facing the first surface 59, a third surface 62 which is placed on a lower side with respect to a paper surface in FIG. 3, and a fourth surface 63 which is placed on an upper side with respect to the paper surface in FIG. 3.

The first prism 56 and the second prism 57 are integrated via the second surface 61. Further, the first prism 56 and the third prism 58 are integrated via the fourth surface 63. Further, the second prism 57 faces the second surface 61 and has a fifth surface 64 which is placed on the right side with respect to the paper surface, and the third prism 58 faces the fourth surface 63 and has a sixth surface 65 which is placed on the upper side with respect to the paper surface.

A surface (an incidence surface) of the first surface 59 is a total transmission surface with an antireflective film provided on the surface. Further, the first surface 59 is orthogonal with respect to the light receiving optical axis 36, the tracking light receiving optical axis 44 and the sighting optical axis 46, an incidence angle of each optical axes with respect to the first surface 59 is 0°.

A dichroic filter, for instance, a short pass filter is vapor-deposited on the second surface 61 (a boundary surface of the first prism 56 and the second prism 57). In a specific wavelength band, the short pass filter has the optical characteristics which a transmittance increases when the incidence angle is small and a reflectance increases when the incidence angle is large. Further, the short pass filter also has the optical characteristics which allow the visible light with a shorter wavelength than a part of the red color or a near-infrared wavelength to transmit through. In the present embodiment, the second surface 61 is configured to transmit through the visible light or the visible light excluding a part of the red color and reflect the reflected distance measuring light and the reflected tracking light.

A reflective film is provided on the third surface 62, and is configured to reflect the reflected distance measuring light and the reflected tracking light reflected on second surface 61. A dichroic filter film is provided on the fourth surface 63, the fourth surface 63 forms a dichroic filter surface. The fourth surface 63 is configured to reflect the reflected distance measuring light toward to the objective lens 37 side and transmit through the reflected tracking light. That is, the fourth surface 63 is a separating surface which separates the reflected distance measuring light and the reflected tracking light from each other.

Further, the fifth surface 64 is configured to totally transmit through the visible light or the visible light excluding a part of the red light. Further, the sixth surface 65 has an antireflective film provided on the surface, and is configured to totally transmit through the reflected tracking light which has been transmitted through the fourth surface 63.

Next, a description will be given on a case where the measurement and the tracking are performed by the surveying instrument 1 having the distance measuring module 19.

The light emitter 29 projects a laser beam having a part of the red color or a near-infrared wavelength, and the projected laser beam enters the beam splitter 34. A part of the laser beam which has entered the beam splitter 34 is reflected onto the internal reference optical axis 52 as the internal reference light.

The internal reference light reflected by the beam splitter 34 is received by the light receiving module 39 via the receiving light lens 53, the reference light receiving modules 54, the reference light imaging lens 55 and the fourth surface 63 of the dichroic prism 38.

Further, a remaining part of the laser beam which has entered the beam splitter 34 is sequentially transmitted through the beam splitter 34 and the dichroic mirror 35 as the distance measuring light, sequentially reflected by then mirror 32 and the reflecting prism 33, and projected from the telescope module 15 via the window portion 30. The distance measuring light projected from the telescope module 15 is irradiated with respect to a predetermined object.

The distance measuring light reflected by the object (the reflected distance measuring light) enters the distance measuring unit 19 from the periphery of the reflecting prism 33 via the window portion 30. The reflected distance measuring light is condensed by the objective lens 37 and enters the dichroic prism 38.

The reflected distance measuring light transmitted through the first surface 59 is internally reflected on the second surface 61, the first surface 59, the third surface 62 and the fourth surface 63 in sequence, and then enters the first surface 59 at an incidence angle of 0°. Further, the reflected distance measuring light which has entered the first surface 59 is transmitted through the first surface 59 and is received by the light receiving module 39.

It is to be noted that the reflected distance measuring light reflected on the second surface 61 is configured to enter the first surface 59 at a critical angle or more. Therefore, the reflected distance measuring light is totally reflected on the first surface 59.

The arithmetic control module 17 calculates a distance to the object based on a light receiving signal produced from the light receiving module 39. Further, the distance measuring unit 19 has the internal reference light receiving module 27. Therefore, by comparing the light receiving signal produced when the light receiving module 39 has received the reflected distance measuring light with the light receiving signal produced when the light receiving module 39 has received the internal reference light, the arithmetic control module 17 enables the more accurate distance measurement.

By the cooperation between the horizontal rotation of the frame unit 5 via the horizontal rotation motor 8 and the vertical rotation of the telescope module 15 via the vertical rotation motor 13, the distance measuring light is irradiated an arbitrary object, and the distance measurement data (a slope distance) is acquired. Further, by detecting a horizontal angle and a vertical angle at the time of the acquisition of the distance measurement data by the horizontal angle encoder 9 and the vertical angle encoder 14, the arithmetic control module 17 enables acquiring the horizontal angle data and the vertical angle data. The three-dimensional coordinates of the object can be calculated by the arithmetic control module 17 based on the distance measurement data, the horizontal angle data, and the vertical angle data.

It is to be noted that the visible light (the background light) enters the distance measuring unit 19 coaxially with the reflected distance measuring light. The visible light or the visible light excluding a part of the red color is transmitted through the second surface 61 of the dichroic prism 38 and enters the sighting module 26. A worker can sight the object based on the visible light or the visible light excluding a part of the red color which has entered the sighting module 26.

Further, in parallel with the distance measurement operation, a laser beam is projected from the tracking light emitter 42 as the tracking light. The tracking light is a laser beam having a part of the red color or a near-infrared wavelength, which differs in wavelength from the distance measuring light, and the tracking light is sequentially reflected by the dichroic mirror 35, the mirror 32 and the reflecting prism 33, and irradiated with respect to the object.

The reflected tracking light reflected by the object enters the distance measuring unit 19 coaxially with the reflected distance measuring light and the visible light. The reflected tracking light which has entered from the periphery of the reflecting prism 33 is condensed by the objective lens 37 and enters the dichroic prism 38.

The reflected distance measuring light transmitted through the first surface 59 is internally reflected on the second surface 61, the first surface 59 and the third surface 62 in sequence, then transmitted through the fourth surface 63 and the sixth surface 65, and received by the image pickup element 45. It is to be noted that an incidence angle of the reflected tracking light with respect to the sixth surface 65 is 0°.

The arithmetic control module 17 calculates a deviation between the center of the image pickup element 45 and an incidence position of the reflected tracking light. Further, the arithmetic control module 17 controls the horizontal rotation motor 8 and the vertical rotation motor 13 so that the incidence position of the reflected tracking light becomes the center of the image pickup element 45 based on the deviation. Thereby, the surveying instrument main body 3 tracks the object.

As described above, in the first embodiment, the dichroic prism 38 having the reflecting surfaces therein is used, and the reflected distance measuring light and the reflected tracking light are internally reflected by the second surface 61, the first surface 59 and the third surface 62, respectively. Thereby, the optical paths of the reflected distance measuring light and the reflected tracking light are bent, and an optical path length for a focal distance of the objective lens 37 is assured.

Therefore, since the lengths in the optical axis direction of the distance measuring light receiving module 23 and the tracking light receiving module 25 can be shortened, the optical system of the distance measuring unit 19 can be miniaturized, and the entire surveying instrument can be miniaturized.

Further, the reflected distance measuring light and the reflected tracking light are reflected internally by the dichroic prism 38. Therefore, the first embodiment can reduce an incidence angle with respect to the fourth surface 63 which separates the reflected distance measuring light from the reflected tracking light. Thereby, the spectroscopic performance can be improved.

Further, by using the dichroic prism 38, an incidence angle with respect to the second surface 61 which separates the visible light or the visible light excluding a part of the red color can reduce. Therefore, a color tone of the visible light entering the sighting module 26 can be improved, and the visibility during the sighting can be enhanced.

Further, in the first embodiment, an optical member for bending the optical path of the reflected distance measuring light does not use a plate-like mirror but a prism. Therefore, a deviation of the optical axis (a deflection angle error) based on the temperature changes with respect to the surveying instrument main body 3 can be suppressed and a measurement accuracy can be improved.

It is to be noted that, a short pass filter may be vapor-deposited on the first surface 59. Since vapor-depositing the short pass filter enables alleviating the total reflection conditions with respect to the first surface 59, the incidence angles of the reflected distance measuring light and the reflected tracking light with respect to the first surface 59 can be made smaller than the critical angle. Therefore, since a tilt of the second surface 61 with respect to the light receiving optical axis 36 can be reduced, the length of the dichroic prism 38 in the optical axis direction can be shortened, and the optical system can be reduced in size and weight.

Further, in the first embodiment, the distance measuring light receiving module 23 is provided on a reflecting side of the fourth surface 63, and the tracking light receiving module 25 is provided on a transmitting side of the fourth surface 63. On the other hand, needless to say, the distance measuring light receiving module 23 may be provided on the transmitting side of the fourth surface 63, and the tracking light receiving module 25 may be provided on the reflecting side of the fourth surface 63.

FIG. 4A, FIG. 4B, and FIG. 5A to FIG. 5D show the modifications of the dichroic prism 38.

Figure 4A:
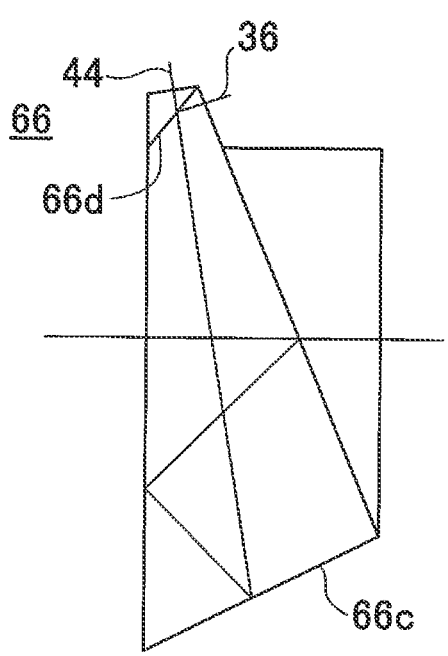
FIG. 4A and FIG. 4B are the block diagrams each showing a modification of the dichroic prism according to the first embodiment.

A dichroic prism 66 shown in FIG. 4A has a different tilt direction of a fourth surface 66d with respect to the light receiving optical axis 36 of the reflected distance measuring light and the tracking light receiving optical axis 44 of the reflected tracking light reflected on a third surface 66c. The fourth surface 66d, as a separating surface, is configured to transmit through the reflected tracking light and reflect the reflected distance measuring light toward the sighting module 26. The other configurations are equivalent to the dichroic prism 38.

Figure 4B:
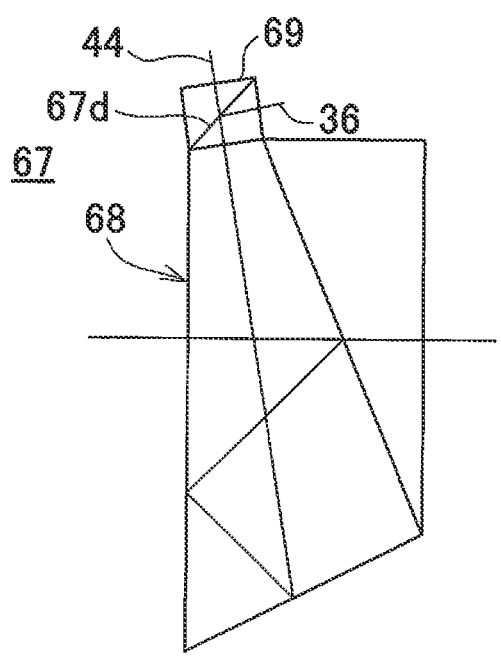

A dichroic prism 67 shown in FIG. 4B has a square prism combining two triangular prisms. The square prism is configured as a third prism 69. Further, a boundary surface of the two triangular prisms of the third prism 69 is a fourth surface 67d as a separating surface having a dichroic filter film provided on the surface. The reflected distance measuring light is separated from the reflected tracking light via the fourth surface 67d.

As described above, the dichroic prism 67 is a square prism having the fourth surface 67d therein. Therefore, changing a mounting position of the third prism 69 with respect to the first prism 68 enables changing a reflecting direction of the reflected distance measuring light to an arbitrary direction centered on the tracking light receiving optical axis 44 of the reflected tracking light.

Figure 5A:
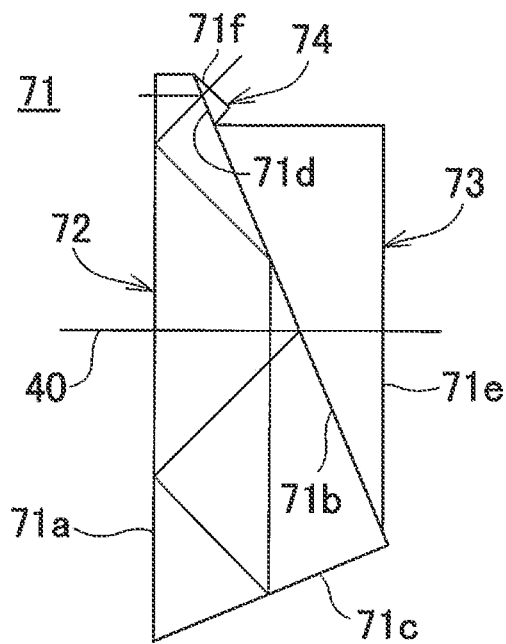
FIG. 5A, FIG. 5B, FIG. 5C and FIG. 5D are the block diagrams each showing a modification of the dichroic prism according to the first embodiment.

In the dichroic prism 71 shown in FIG. 5A, a second prism 73 and a third prisms 74 are attached to and integrated with a second surface 71b of a first prism 72, respectively. In the dichroic prism 71, a boundary surface of the second surface 71b and the second prism 73 is a separating surface for the visible light or the visible light excluding a part of the red color, a boundary surface of the second surface 71b and the third prism 74 is a fourth surface 71d as a separating surface of the reflected distance measuring light and the reflected tracking light.

A chief lay 40 of each of the reflected distance measuring light, the reflected tracking light and the visible light which have entered a first surface 71a is transmitted through the first surface 71a, and enter the second surface 71b. The second surface 71b transmits through the visible light or the visible light excluding a part of the red color, and reflects the reflected distance measuring light and the reflected tracking light. That is, the second surface 71b separates the visible light or the visible light excluding a part of the red light from the chief lay 40. The visible light or the visible light excluding a part of the red color which has been separated is transmitted through a fifth surface 71e and enters the sighting module 26. Further, the reflected distance measuring light and the reflected tracking light reflected on the second surface 71b are sequentially reflected on the first surface 71a, a third surface 71c, the second surface 71b, and the first surface 71a, and enter the fourth surface 71d.

The fourth surface 71d reflects the reflected distance measuring light and transmits through the reflected tracking light. That is, the fourth surface 71d separates the reflected distance measuring light and the reflected tracking light from each other. The reflected distance measuring light reflected on the fourth surface 71d is transmitted through the first surface 71a and enters the light receiving module 39. Further, the reflected tracking light transmitted through the fourth surface 71d is transmitted through a sixth surface 71f and enters the image pickup element 45.

The dichroic prism 71 is configured in such a manner that the reflected distance measuring light and the reflected tracking light are internally reflected in the dichroic prism 71 five times and then separated by the fourth surface 71d. Therefore, the lengths in the optical axis direction of the distance measuring light receiving module 23 and the tracking light receiving module 25 can be further shortened.

Figure 5B:
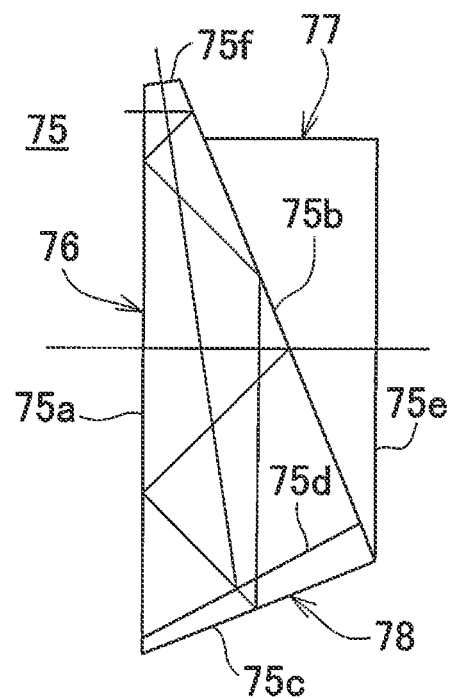

In the dichroic prism 75 shown in FIG. 5B, a third prism 78 is attached to a lower surface of a first prism 76, a second prism 77 is attached across a second surface 75b of the first prism 76 and the third prism 78, and the first prism 76, the second prism 77 and the third prism 78 are integrated. In the dichroic prism 75, a lower surface of the third prism 78 with respect to the paper surface is a third surface 75c, and a boundary surface of the third surface 75c and the third prism 78 is a fourth surface 75d. Further, an upper surface of the first prism 76 with respect to the paper surface is a sixth surface 75f.

A chief lay 40 of each of the reflected distance measuring light, the reflected tracking light and the visible light which have entered a first surface 75a is transmitted through the first surface 75a, and enters the second surface 75b as a separating surface of the visible light and the visible light excluding a part of the red color. The second surface 75b transmits through the visible light or the visible light excluding a part of the red color, and reflects the reflected distance measuring light and the reflected tracking light. Further, the reflected distance measuring light and the reflected tracking light reflected on the second surface 75b are reflected on the first surface 75a, and enter the fourth surface 75d as a separating surface.

The fourth surface 75d reflects the reflected distance measuring light and transmits through the reflected tracking light. The reflected distance measuring light reflected on the fourth surface 75d is transmitted through the sixth surface 75f and enters the light receiving module 39. Further, the reflected tracking light transmitted through the fourth surface 75d is sequentially reflected on the third surface 75c, the second surface 75b, the first surface 75a and the second surface 75b, transmitted through the first surface 75a, and received by the image pickup element 45.

The dichroic prism 75 is configured in such a manner that the reflected tracking light is internally reflected in the dichroic prism 75 six times. Therefore, the length in the optical axis direction of the tracking light receiving module 25 can be further shortened.

Figure 5C:
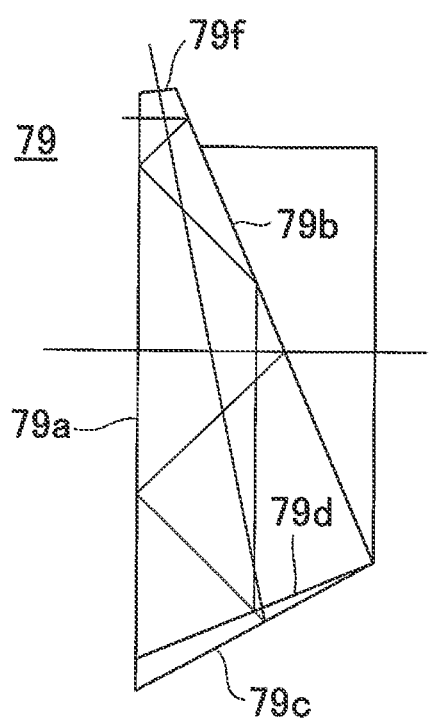

A dichroic prism 79 shown in FIG. 5C has substantially the same configuration as that of the dichroic prism 75. However, a tilt direction of a fourth surface 79d of the dichroic prism 79 with respect to the optical axes of the reflected distance measuring light and the reflected tracking light reflected on a first surface 79a is different from the dichroic prism 75.

The reflected distance measuring light and the reflected tracking light reflected on a second surface 79b as a separating surface for the visible light or the visible light excluding a part of the red color are reflected on the first surface 79a, and enter the fourth surface 79d as a separating surface. The fourth surface 79d reflects the reflected distance measuring light and transmits through the reflected tracking light.

The reflected distance measuring light reflected on the fourth surface 75d is sequentially reflected on the second surface 79b, the first surface 79a and the second surface 79b, then transmitted through the first surface 79a, and received by the light receiving module 39. Further, the reflected tracking light transmitted through the fourth surface 79d is reflected on the third surface 79c, then transmitted through a sixth surface 79f, and received by the image pickup element 45.

The dichroic prism 79 is configured in such a manner that the reflected distance measuring light is internally reflected in the dichroic prism 79 six times. Therefore, the length in the optical axis direction of the distance measuring light receiving module 23 can be further shortened.

Figure 5D:
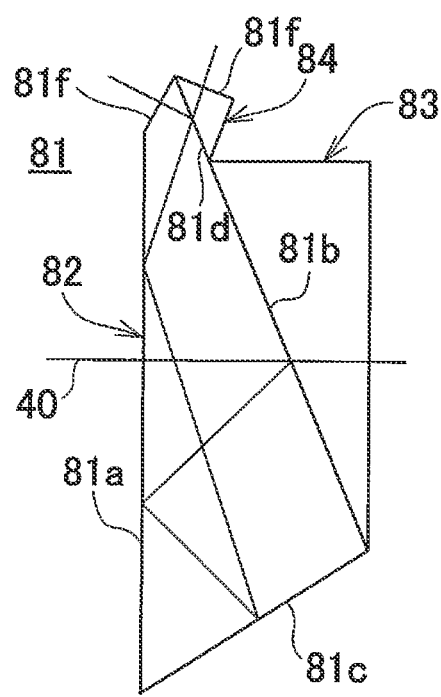

In a dichroic prism 81 shown in FIG. 5D, like the dichroic prism 71, a second prism 83 and a third prisms 84 are attached to and integrated with a second surface 81b of a first prism 82, respectively. Further, each of an upper surface of the third prism 84 with respect to the paper surface and an upper surface of the first prism 82 with respect to the paper surface is a sixth surface 81f having an antireflective film provided on the surface.

A chief lay 40 of each of the reflected distance measuring light, the reflected tracking light and the visible light which have entered a first surface 81a is transmitted through the first surface 81a, and enters the second surface 81b as a separating surface for the visible light or the visible light excluding a part of the red color. The second surface 81b transmits through the visible light or the visible light excluding a part of the red color, and reflects the reflected distance measuring light and the reflected tracking light. Further, the reflected distance measuring light and the reflected tracking light reflected on the second surface 81b are sequentially reflected on the first surface 81a, a third surface 81c and the first surface 81a, and enter a fourth surface 81d as a separating surface.

The fourth surface 81d reflects the reflected distance measuring light and transmits through the reflected tracking light. The reflected distance measuring light reflected on the fourth surface 81d is transmitted through the sixth surface 81f of the first prism 82, and received by the light receiving module 39. Further, the reflected tracking light transmitted through the fourth surface 81d is transmitted through the sixth surface 81f of the third prism 84, and received by the image pickup element 45.

It is to be noted that, likewise, in FIG. 4A, FIG. 4B, and FIG. 5A to FIG. 5D, needless to say, the tracking light receiving module 25 may be arranged on a reflecting side of the fourth surface, and the distance measuring light receiving module 23 may be arranged on a transmitting side of the fourth surface.

Figure 6:
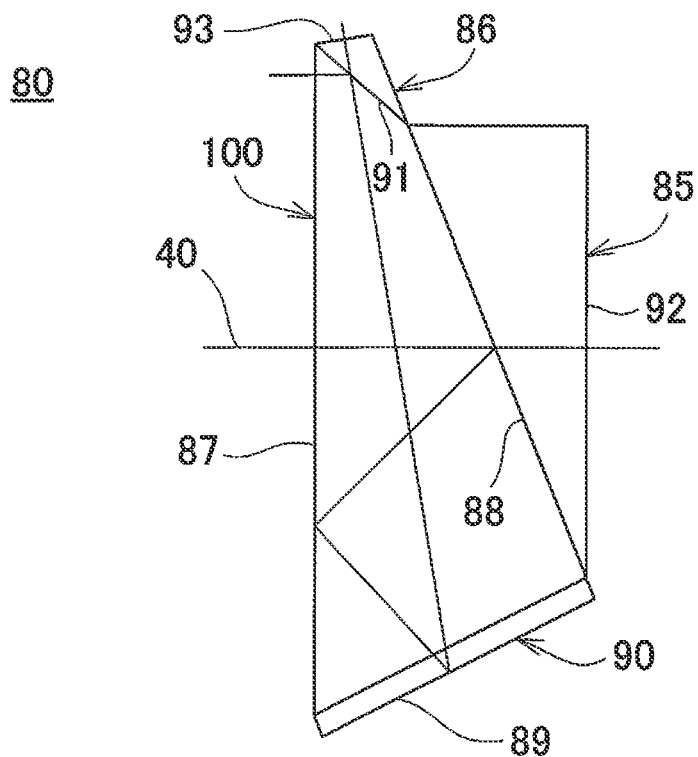
FIG. 6 is a block diagram showing a dichroic prism of a distance measuring unit according to a second embodiment of the present invention.

Next, by referring to FIG. 6, a description will be given on a second embodiment of the present invention. It is to be noted that, in FIG. 10, the same components as shown in FIG. 3 are referred by the same symbols, and a detailed description thereof will be omitted.

A dichroic prism 80 in the second embodiment has a configuration in which a color glass 90 is added to the dichroic prism 38 in the first embodiment. Further, the structures other than the dichroic prism 80 are the same as the structures in the first embodiment.

The dichroic prism 80 has a first prism 100, a second prism 85 and a third prism 86, the color glass 90 is attached to and integrated with a lower surface of the first prism 100 with respect to the paper surface.

In the second embodiment, a surface of the first prism 100 facing an objective lens 37 (see FIG. 2) is a first surface 87, a boundary surface of the first prism 100 and the second prism 85 is a second surface 88, a lower surface of the color glass 90, that is, a surface facing the boundary surface of the first prism 100 and the color glass 90 is a third surface 89, and a boundary surface of the first prism 100 and the third prism 86 is a fourth surface 91. Further, a right surface of the second prism 85 with respect to the paper surface is a fifth surface 92, and an upper surface of the third prism 86 with respect to the paper surface is a sixth surface 93. It is to be noted that the third surface 89 is a reflecting surface having an antireflective film provided on the surface.

A chief lay 40 of each of the reflected distance measuring light, the reflected tracking light and the visible light which have entered the first surface 87 is transmitted through the first surface 87, and enters the second surface 88 as a separating surface for the visible light or the visible light excluding a part of the red color. The second surface 88 transmits through the visible light or the visible light excluding a part of the red color, and reflects the reflected distance measuring light and the reflected tracking light. The visible light or the visible light excluding a part of the red color which has been transmitted through the second surface 88 is transmitted through the fifth surface 92, and enters a sighting module 26 (see FIG. 2). Further, the reflected distance measuring light and the reflected tracking light reflected on the second surface 88 are sequentially reflected on the first surface 87 and the third surface 89, and enter the fourth surface 91 as a separating surface.

The fourth surface 91 reflects the reflected distance measuring light and transmits through the reflected tracking light. The reflected distance measuring light reflected on the fourth surface 91 is transmitted through the first surface 87, and received by a light receiving module 39 (see FIG. 2). Further, the reflected tracking light transmitted through the fourth surface 91 is transmitted through the sixth surface 93, and received by an image pickup element 45 (see FIG. 2).

The reflected distance measuring light and the reflected tracking light pass through the color glass 90 when the reflected distance measuring light and the reflected tracking light are reflected on the third surface 89. In a process of passing through the color glass 90, the absorption in the color glass 90 attenuates or eliminates the disturbance light of the reflected distance measuring light and the reflected tracking light.

In the second embodiment, by providing the color glass 90 with respect to the dichroic prism 80, the disturbance light of the reflected distance measuring light and the reflected tracking light enable attenuating and eliminating. Therefore, since the effects of the disturbance light can be reduced or eliminated from the distance measurement results and the tracking results, a distance measurement accuracy and a tracking accuracy can be improved. On the other hand, it is possible to reduce or eliminate the effects of the disturbance light by a thin film without providing the color glass, but the disturbance light may be reflected without being absorbed, and a small effect may be left.

It is to be noted that providing the color glass 90 at a position as far away as possible from the image pickup element 45 is desirable. In this case, in a case where there is an internal defect in the color glass 90, the internal defect in the color glass 90 is reflected in the image pickup element 45, which affects the tracking accuracy. In a case where the color glass 90 is provided close to the image pickup element 45, an additional sorting operation for the internal defects in the color glass 90 will be required.

Further, since the internal defects in the color glass do not affect the distance measurement results, a position of the color glass 90 with respect to the light receiving module 39 is not restricted, and the color glass 90 can be provided at an arbitrary position.

FIG. 7A, FIG. 7B, FIG. 8A to FIG. 8D, FIG. 9A and FIG. 9B show the modifications of the dichroic prism 80.

Figure 7A:
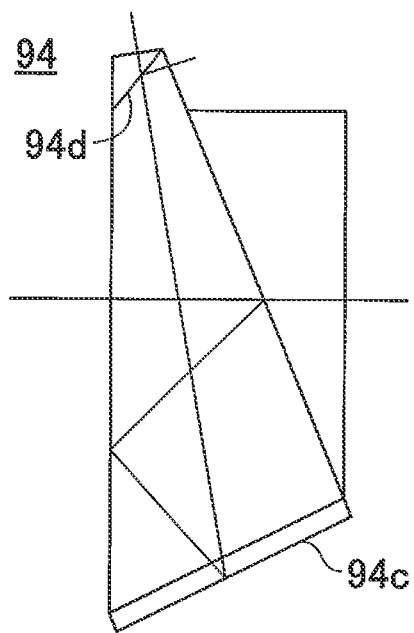
FIG. 7A and FIG. 7B are the block diagrams each showing a modification of the dichroic prism according to the second embodiment.

A dichroic prism 94 shown in FIG. 7A has a different tilt direction of a fourth surface 94d with respect to the optical axes of the reflected distance measuring light and the reflected tracking light reflected on a third surface 94c. The reflected tracking light is transmitted through the fourth surface 94d as a separating surface, and the reflected distance measuring light is reflected toward the sighting module 26 by the fourth surface 94d. The other configurations are equivalent to the dichroic prism 80.

Figure 7B:
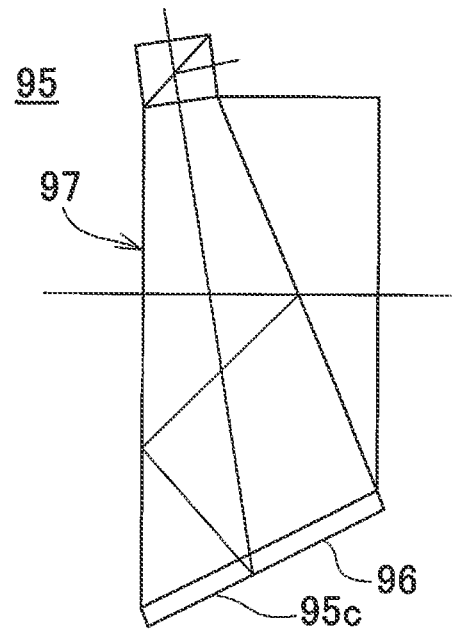

A dichroic prism 95 shown in FIG. 7B has a configuration in which a color glass 96 is provided on a lower surface of the dichroic prism 66 shown in FIG. 4B with respect to the paper surface. Further, a surface facing a boundary surface of a first prism 97 and the color glass 96 is a third surface 95c. The other configurations are equivalent to the dichroic prism 66.

Figure 8A:
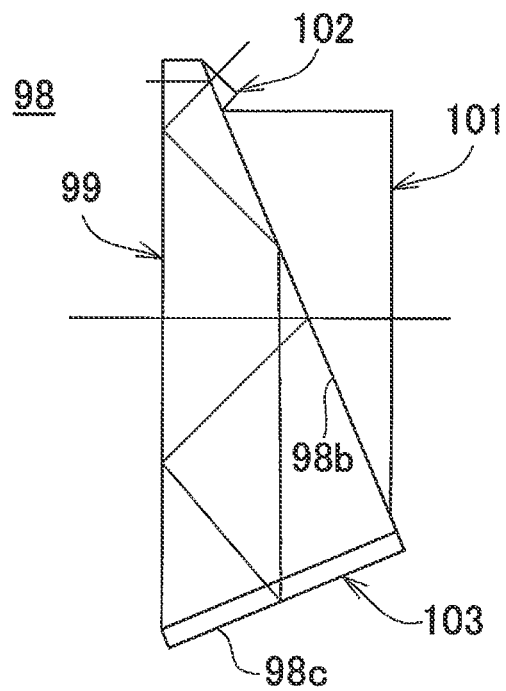
FIG. 8A, FIG. 8B, FIG. 8C and FIG. 8D are the block diagrams each showing a modification of the dichroic prism according to the second embodiment.

A dichroic prism 98 shown in FIG. 8A has a configuration substantially equivalent to a dichroic prism 71 shown in FIG. 5A. A second prism 101 and a third prisms 102 are attached to a second surface 98b as a separating surface, respectively. Further, a color glass 103 is attached to and integrated with a lower surface of a first prism 99 with respect to the paper surface. A surface of the color glass 103 facing a boundary surface of the color glass 103 and the first prism 99 is a third surface 98c. The other configurations are equivalent to the dichroic prism 71.

Figure 8B:
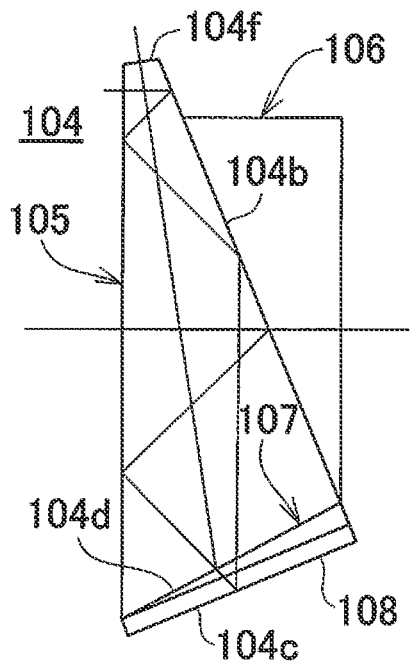

A dichroic prism 104 shown in FIG. 8B has a configuration substantially equivalent to the dichroic prism 75 shown in FIG. 5B. A third prism 107 is attached to a lower surface of a first prism 105 with respect to the paper surface. A second prism 106 is attached to a second surface 104b of the first prism 105. A color glass 108 is attached to a surface of the third prism 107 facing a boundary surface of the third prism 107 and the first prism 105. That is, the first prism 105, the second prism 106, the third prism 107 and the color glass 108 are integrated. In the dichroic prism 104, a boundary surface of the first prism 105 and the third prism 107 is a fourth surface 104d as a separating surface, and a surface of the color glass 108 facing the fourth surface 104d is a third surface 104c.

The reflected distance measuring light is reflected on the fourth surface 104d, and transmitted through a sixth surface 104f. On the other hand, the reflected tracking light is transmitted through the fourth surface 104d and passes through the color glass 108 in a process of being reflected on the third surface 104c. Thereby, the disturbance light is attenuated or eliminated. Therefore, the disturbance light does not affect the light reception results, and a tracking accuracy can be improved.

Figure 8C:
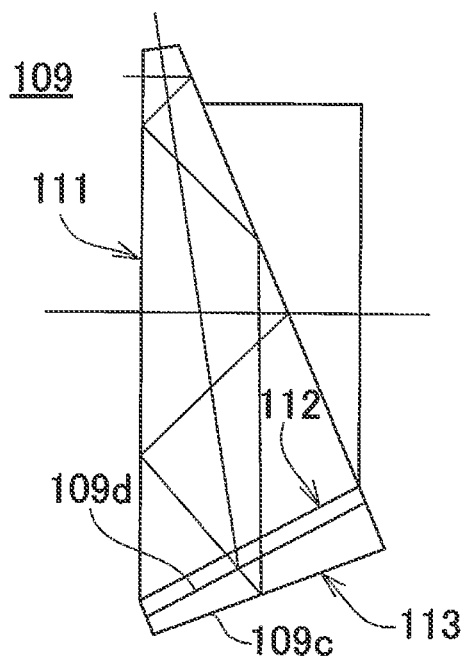

A dichroic prism 109 shown in FIG. 8C is a modification of the dichroic prism 104 shown in FIG. 8B. In the dichroic prism 109, a color glass 112 is attached to a lower surface of a first prism 111 with respect to the paper surface, and a third prism 113 is attached to and integrated with the color glass 112. That is, the color glass 112 is provided between the first prism 111 and the third prism 113.

In the dichroic prism 109, a boundary surface of the color glass 112 and the third prism 113 is a fourth surface 109d as a separating surface, and a surface of the third prism 113 facing the fourth surface 109d is a third surface 109c.

In the dichroic prism 109, the disturbance light of not only the reflected tracking light but also the reflected distance measuring light can be attenuated or eliminated. Therefore, a distance measurement accuracy and a tracking accuracy can be improved.

Figure 8D:
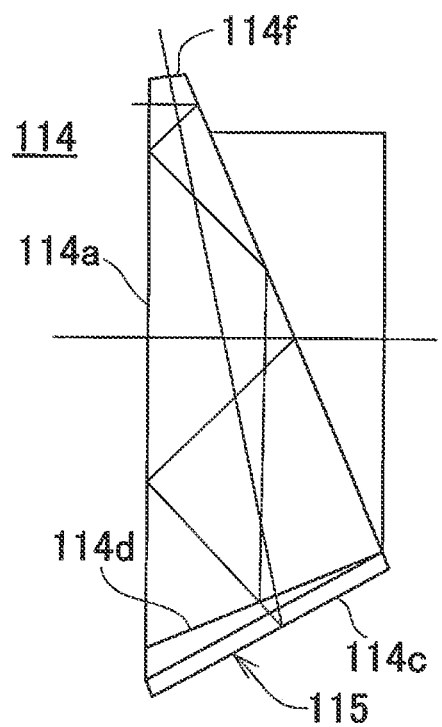

A dichroic prism 114 shown in FIG. 8D has substantially the same configuration as that of the dichroic prism 104 shown in FIG. 8B. However, a tilt direction of a fourth surface 114d of the dichroic prism 114 with respect to the optical axes of the reflected distance measuring light and the reflected tracking light reflected on a first surface 114a is different from the dichroic prism 104.

The reflected distance measuring light is reflected on the fourth surface 114d as a separating surface. On the other hand, the reflected tracking light is transmitted through the fourth surface 114d and passes through the color glass 115 in a process of being reflected on the third surface 114c, and the disturbance light is attenuated or eliminated. Therefore, the disturbance light does not affect the light reception results, and a tracking accuracy can be improved.

Figure 9A:
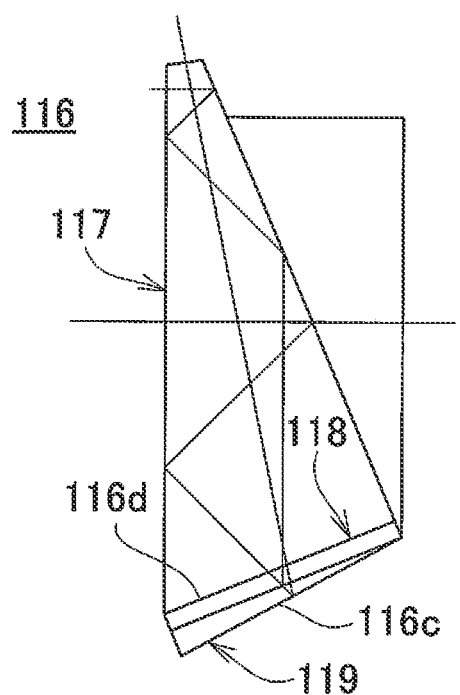
FIG. 9A and FIG. 9B are the block diagrams each showing a modification of the dichroic prism according to the second embodiment.

A dichroic prism 116 shown in FIG. 9A is a modification of the dichroic prism 114 shown in FIG. 8D. In the dichroic prism 116, a color glass 118 is attached to a lower surface of a first prism 117 with respect to the paper surface, a third prism 119 is attached to the color glass 118, and the first prism 117, the color glass 118 and the third prism 119 are integrated. That is, the color glass 118 is provided between the first prism 117 and the third prism 119.

In the dichroic prism 116, a boundary surface between the color glass 118 and the third prism 119 is a fourth surface 116d as a separating surface, and a surface of the third prism 119 facing the fourth surface 116d is a third surface 116c.

In the dichroic prism 116, the disturbance light of not only the reflected tracking light but also the reflected distance measuring light can be attenuated or eliminated. Therefore, a distance measurement accuracy and a tracking accuracy can be improved.

Figure 9B:
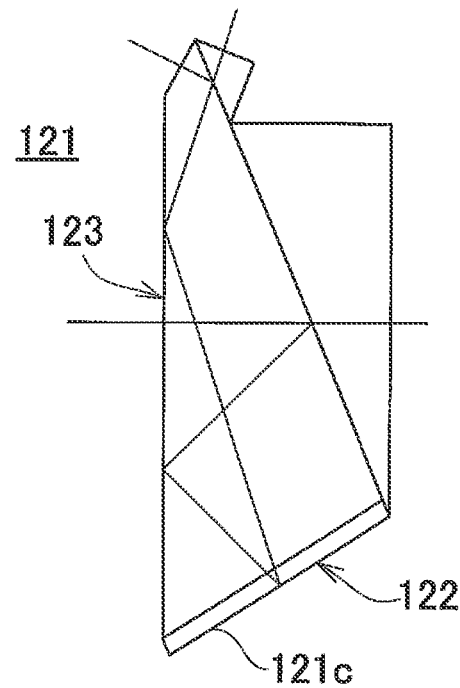

A dichroic prism 121 shown in FIG. 9B has a configuration in which a color glass 122 is provided on a lower surface of the dichroic prism 81 shown in FIG. 5D with respect to the paper surface. Further, a surface of the color glass 122 facing a boundary surface of the color glass 122 and the first prism 123 is a third surface 121c. The other configurations are equivalent to the dichroic prism 81.

It is to be noted that, likewise, in FIG. 7A, FIG. 7B, FIG. 8A to FIG. 8D, FIG. 9A and FIG. 9B, needless to say, the tracking light receiving module 25 may be arranged on a reflecting side of the fourth surface, and the distance measuring light receiving module 23 may be arranged on a transmitting side of the fourth surface.

Figure 10:
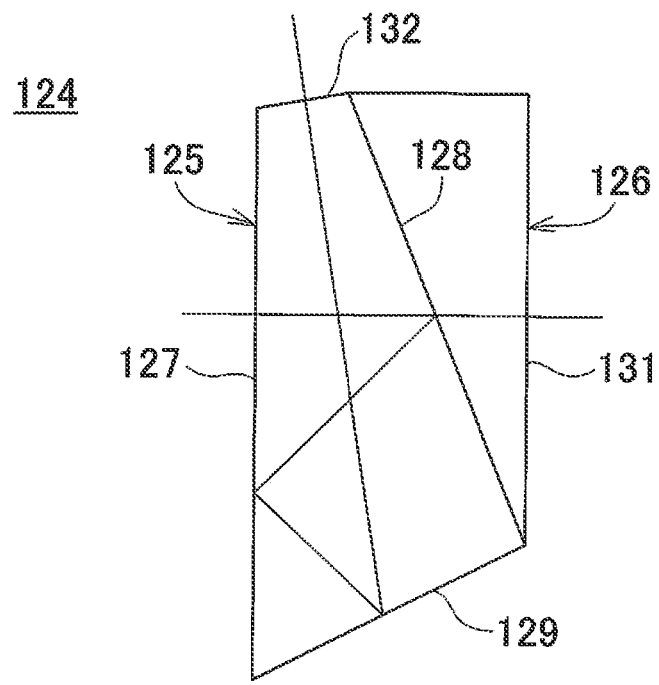
FIG. 10 is a block diagram showing a dichroic prism of a distance measuring unit according to a third embodiment of the present invention.

Next, by referring to FIG. 10, a description will be given on a third embodiment of the present invention. It is to be noted that, in FIG. 10, the same components as shown in FIG. 3 are referred by the same symbols, and a detailed description thereof will be omitted.

The third embodiment has a configuration in which a tracking light projecting module 24 (see FIG. 2) and a tracking light receiving module 25 (see FIG. 2) are eliminated from a surveying instrument main body 3 (see FIG. 1). The other structures are the same as the structures in the first embodiment.

In a dichroic prism 124 in the third embodiment has a configuration in which a third prism is not provided, and a first prism 125 and a second prism 126 are attached to and integrated with each other.

A surface of the first prism 125 facing an objective lens 37 (see FIG. 2) is a first surface 127, a boundary surface of the first prism 125 and the second prism 126 is a second surface 128, and a lower surface of the first prism 125 with respect to the paper surface is a third surface 129. Further, a right surface of the second prism 126 with respect to the paper surface is a fifth surface 131, and an upper surface of the first prism 125 with respect to the paper surface is a sixth surface 132.

A chief lay 40 of each of the reflected distance measuring light and the visible light which have entered the first surface 127 is transmitted through the first surface 127, and enters the second surface 128 as a separating surface for the visible light or the visible light excluding a part of the red color. The second surface 128 transmits through the visible light or the visible light excluding a part of the red color, and reflects the reflected distance measuring light. The visible light or the visible light excluding a part of the red color which has been transmitted through the second surface 128 is transmitted through the fifth surface 131, and enters a sighting module 26 (see FIG. 2). Further, the reflected distance measuring light reflected on the second surface 128 is internally reflected on the first surface 127 and the third surface 129 sequentially, and transmits through the sixth surface 132. The reflected distance measuring light transmitted through the sixth surface 132 is received by a light receiving module 39 (see FIG. 2).

The third embodiment is configured in such a manner that the reflected distance measuring light is internally reflected in the dichroic prism 124 three times, and hence an optical path length for a focal distance of the objective lens 37 can be assured.

Therefore, since a length in an optical axis direction of the distance measuring light receiving module 23 can be shortened, the optical system of the distance measuring unit 19 can be miniaturized, and the entire surveying instrument can be miniaturized.

FIG. 11A to FIG. 11D and FIG. 12A to FIG. 12D show the modifications the dichroic prism 124.

Figure 11A:
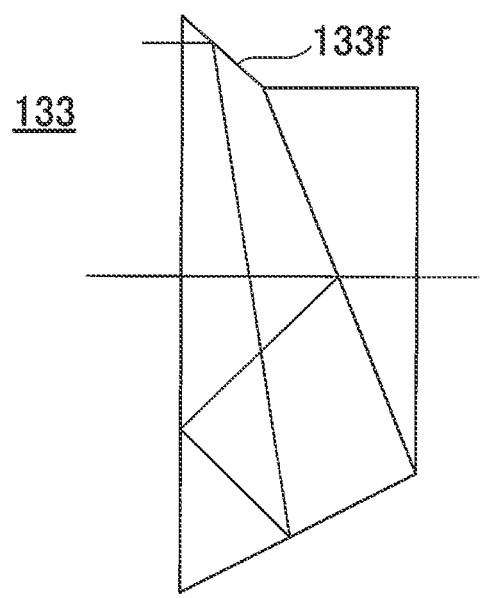
FIG. 11A, FIG. 11B, FIG. 11C and FIG. 11D are the block diagrams each showing a modification of the dichroic prism according to the third embodiment.

A dichroic prism 133 shown in FIG. 11A has a reflective film provided on a sixth surface 133f. Further, the sixth surface 133f is tilted with respect to an optical axis of the reflected distance measuring light, and configured to reflect the reflected distance measuring light toward to an objective lens 37 (see FIG. 2) side. The other configurations are equivalent to the dichroic prism 124.

It is to be noted that, in a case where an incidence angle of the reflected distance measuring light to the sixth surface 133f is a critical angle or more, the reflective film may be omitted.

Figure 11B:
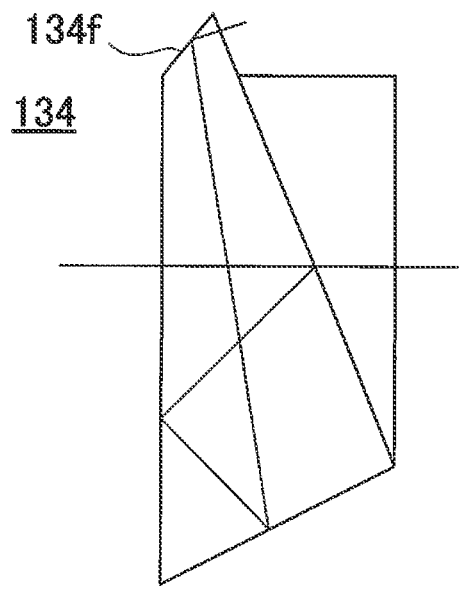

A dichroic prism 134 shown in FIG. 11B has substantially the same configuration as that of the dichroic prism 133. However, a tilt direction of a sixth surface 134f of the dichroic prism 134 with respect to the optical axis of the reflected distance measuring light is different from the dichroic prism 133.

The dichroic prism 134 is configured to reflect the reflected distance measuring light toward a sighting module 26 (see FIG. 2).

Figure 11C:
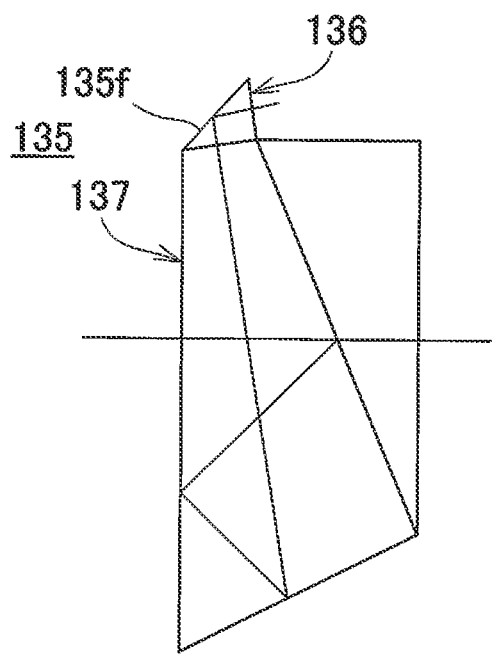

A dichroic prism 135 shown in FIG. 11C has a configuration in which a triangular prism 136 is attached to and integrated with an upper surface of the first prism 125 of the dichroic prism 124 with respect to the paper surface. Further, a left surface of the triangular prism 136 with respect to the paper surface is a sixth surface 135f tilted with respect to the optical axis of the reflected distance measuring light, and the reflected distance measuring light is reflected by the sixth surface 135f.

As described above, the dichroic prism 135 has the triangular prism 136 additionally provided to reflect the reflected distance measuring light. Therefore, by changing a mounting position of the triangular prism 136 with respect to the first prism 137, the dichroic prism 135 enables changing a reflecting direction of the reflected distance measuring light to an arbitrary direction centered on the optical axis of the reflected distance measuring light.

Figure 11D:
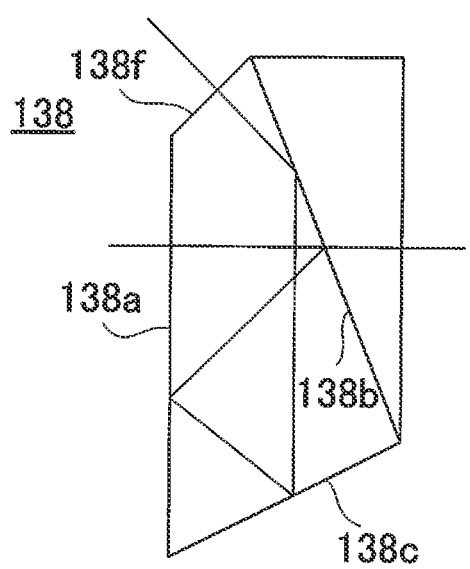

A dichroic prism 138 shown in FIG. 11D has a configuration in which the reflected distance measuring light transmitted through a first surface 138a and reflected on a second surface 138b as a separating surface for the visible light or the visible light excluding a part of the red color is internally reflected on the first surface 138a, a third surface 138c and the second surface 138b sequentially, then transmitted through a sixth surface 138f, and received by the light receiving module 39.

The dichroic prism 138 is configured in such a manner that the reflected distance measuring light is internally reflected in the dichroic prism 138 four times. Therefore, the length in the optical axis direction of the distance measuring light receiving module 23 can be further shortened, and the distance measuring light receiving module 23 can be miniaturized.

Figure 12A:
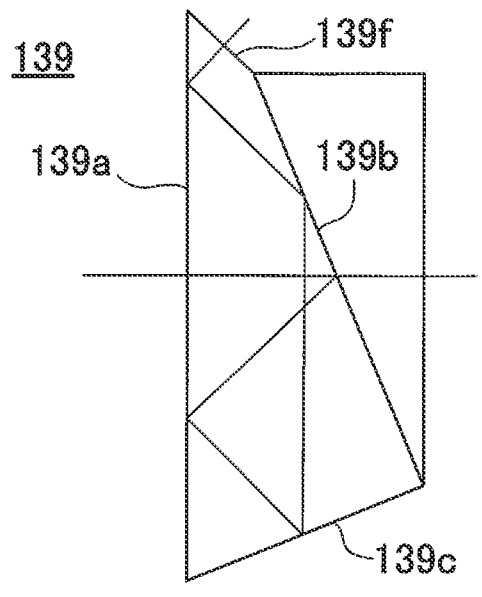
FIG. 12A, FIG. 12B, FIG. 12C and FIG. 12D are the block diagrams each showing a modification of the dichroic prism according to the third embodiment.

A dichroic prism 139 shown in FIG. 12A has a configuration in which the reflected distance measuring light transmitted through a first surface 139a and reflected on a second surface 139b as a separating surface for the visible light or the visible light excluding a part of the red color is internally reflected on the first surface 139a, a third surface 139c, the second surface 139b and the first surface 139a sequentially, then transmitted through a sixth surface 139f, and received by the light receiving module 39.

The dichroic prism 139 is configured in such a manner that the reflected distance measuring light is internally reflected in the dichroic prism 139 five time. Therefore, the length in the optical axis direction of the distance measuring light receiving module 23 can be further shortened, and the distance measuring light receiving module 23 can be miniaturized.

Figure 12B:
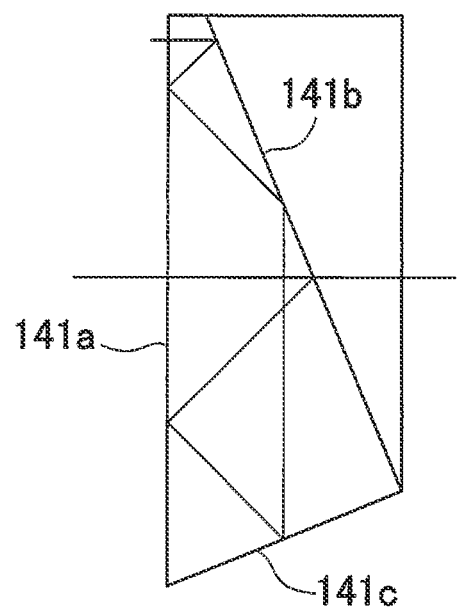

A dichroic prism 141 shown in FIG. 12B has a configuration in which the reflected distance measuring light transmitted through a first surface 141a and reflected on a second surface 141b as a separating surface for the visible light or the visible light excluding a part of the red color is internally reflected on the first surface 141a, a third surface 141c, the second surface 141b, the first surface 141a and the second surface 141b sequentially, then transmitted through the first surface 141a, and received by the light receiving module 39.

The dichroic prism 141 is configured in such a manner that the reflected distance measuring light is internally reflected in the dichroic prism 141 six times. Therefore, the length in the optical axis direction of the distance measuring light receiving module 23 can be further shortened, and the distance measuring light receiving module 23 can be miniaturized.

Figure 12C:
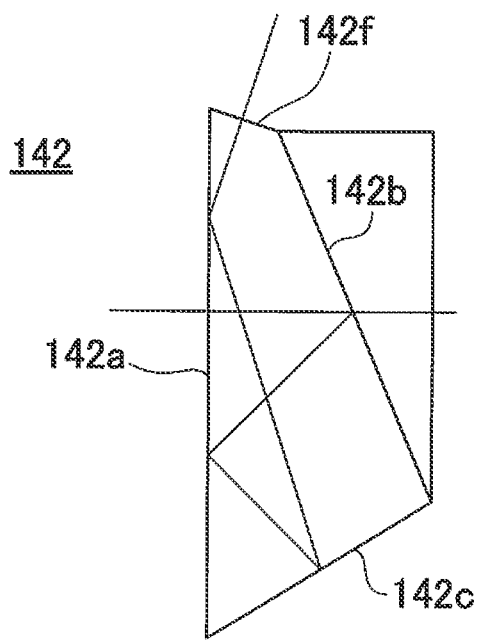

A dichroic prism 142 shown in FIG. 12C has a configuration in which the reflected distance measuring light transmitted through a first surface 142a and reflected on a second surface 142b as a separating surface for the visible light or the visible light excluding a part of the red color is internally reflected on the first surface 142a, a third surface 142c and the first surface 141a sequentially, then transmitted through a sixth surface 142f, and received by the light receiving module 39.

The dichroic prism 142 is configured in such a manner that the reflected distance measuring light is internally reflected in the dichroic prism 142 four times. Therefore, in comparison with the dichroic prism 124, the length in the optical axis direction of the distance measuring light receiving module 23 can be further shortened, and the distance measuring light receiving module 23 can be miniaturized.

Figure 12D:
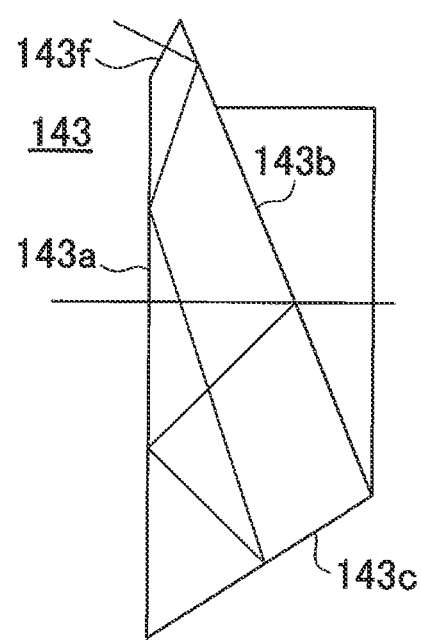

A dichroic prism 143 shown in FIG. 12D has a configuration in which the reflected distance measuring light transmitted through a first surface 143a and reflected on a second surface 143b as a separating surface for the visible light or the visible light excluding a part of the red color is internally reflected on the first surface 143a, a third surface 143c, the first surface 143a and the second surface 143b sequentially, then transmitted through a sixth surface 143f, and received by the light receiving module 39.

The dichroic prism 143 is configured in such a manner that the reflected distance measuring light is internally reflected in the dichroic prism 143 five times. Therefore, the length in the optical axis direction of the distance measuring light receiving module 23 can be further shortened, and the distance measuring light receiving module 23 can be miniaturized.

It is to be noted that, in a case where an incidence angle for the second time of the reflected distance measuring light with respect to the second surface 143b is a critical angle or more, the reflective film may be removed only from a portion the reflected distance measuring light enters for the second time.

It is to be noted that the third embodiment and the modifications may be combined with the second embodiment, and the color glass may be added. By adding the color glass, the dichroic prism 143 can attenuate or eliminate the disturbance light of the reflected distance measuring light and can improve a distance measurement accuracy.

Figure 13:
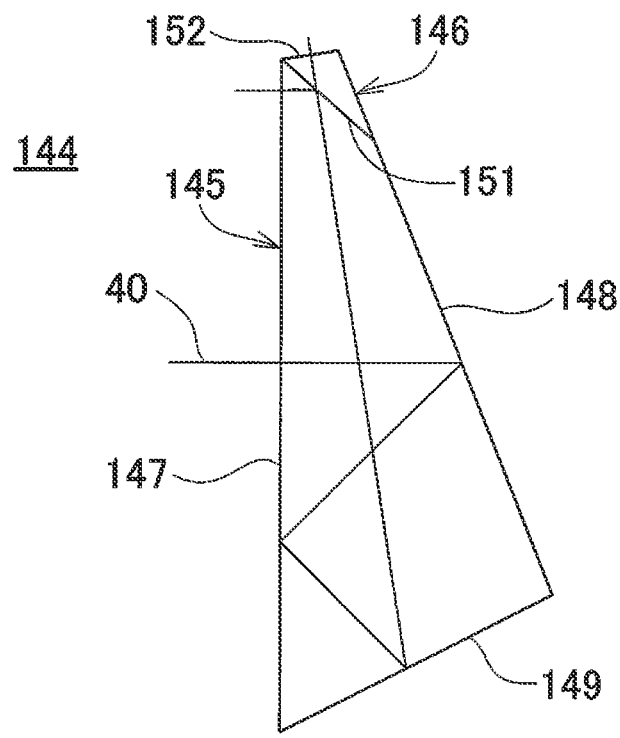
FIG. 13 is a block diagram showing a dichroic prism of a distance measuring unit according to a fourth embodiment of the present invention.

Next, by referring to FIG. 13, a description will be given on a fourth embodiment of the present invention. It is to be noted that, in FIG. 13, the same components as shown in FIG. 3 are referred by the same symbols, and a detailed description thereof will be omitted.

The fourth embodiment has a configuration in which a sighting module 26 (see FIG. 2) is eliminated from a surveying instrument main body 3 (see FIG. 1). The other structures are the same as the structures in the first embodiment. On the other hand, in the fourth embodiment, the distance measuring light and the tracking light may both have any wavelength of the visible light or the near-infrared light.

In a dichroic prism 144 in the fourth embodiment has a configuration in which a second prism is not provided, and a first prism 145 and a third prism 146 are attached to and integrated with each other.

In the dichroic prism 144, a surface of the first prism 145 facing an objective lens 37 (see FIG. 2) is a first surface 147, a surface of the first prism 145 facing the first surface 147 is a second surface 148, and a lower surface of the first prism 145 with respect to the paper surface is a third surface 149. Further, in the dichroic prism 144, a boundary surface of the first prism 145 and the third prism 146 is a fourth surface 151, and an upper surface of the third prism 146 with respect to the paper surface is a sixth surface 152.

The chief lays 40 of the reflected distance measuring light and the reflected tracking light transmitted through the first surface 147 are internally reflected on the second surface 148, the first surface 147 and the third surface 149 sequentially, and then enter the fourth surface 151 as a separating surface.

In the reflected distance measuring light and the reflected tracking light which have entered the fourth surface 151, the reflected distance measuring light is reflected on the fourth surface 151, transmitted through the first surface 147, and received by a light receiving module 39 (see FIG. 2). Further, the reflected tracking light is transmitted through the fourth surface 151 and the sixth surface 152, and received by an image pickup element 45 (see FIG. 2).

The four embodiment is configured in such a manner that the reflected distance measuring light and the reflected tracking light are internally reflected in the dichroic prism 144 three times, and hence an optical path length for a focal distance of the objective lens 37 can be assured.

Therefore, since the lengths in the optical axis direction of the distance measuring light receiving module 23 (see FIG. 2) and the tracking light receiving module 25 (see FIG. 2) can be shortened, the optical system of the distance measuring unit 19 can be miniaturized, and the entire surveying instrument can be miniaturized.

FIG. 14A, FIG. 14B, FIG. 15A to FIG. 15D, FIG. 17A, and FIG. 17B show the modifications of the dichroic prism 144.

Figure 14A:
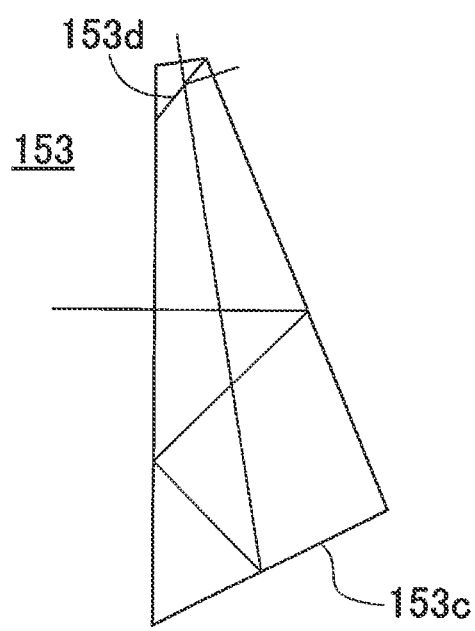
FIG. 14A and FIG. 14B are the block diagrams each showing a modification of the dichroic prism according to the fourth embodiment.

A dichroic prism 153 shown in FIG. 14A has a different tilt direction from a fourth surface 153d with respect to the reflected distance measuring light and the reflected tracking light reflected on a third surface 153c. The reflected tracking light is transmitted through the fourth surface 153d as a separating surface, and the reflected distance measuring light is reflected toward the opposite side of the objective lens 37 by the fourth surface 153d. The other configurations are equivalent to the dichroic prism 144.

Figure 14B:
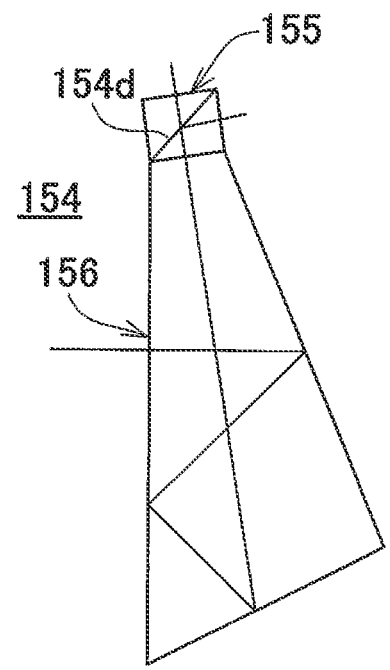

In a dichroic prism 154 shown in FIG. 14B, a square prism combining two triangular prisms is configured as a third prism 155, and a boundary surface of the two triangular prisms is a fourth surface 154d as a separating surface.

Therefore, by changing a mounting position of the third prism 155 with respect to the first prism 156, the dichroic prism 154 enables changing a reflecting direction of the reflected distance measuring light to an arbitrary direction centered on the optical axis of the reflected tracking light.

Figure 15A:
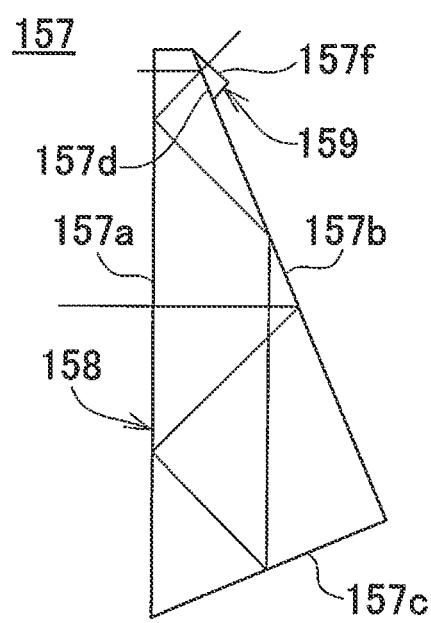
FIG. 15A, FIG. 15B, FIG. 15c and FIG. 15D are the block diagrams each showing a modification of the dichroic prism according to the fourth embodiment.

A dichroic prism 157 shown in FIG. 15A has a configuration in which a third prism 159 is attached to and integrated with a part of a second surface 157b of a first prism 158. Further, in the dichroic prism 157, a boundary surface of the first prism 158 and the third prism 159 is a fourth surface 157d as a separating surface, and a right surface of the third prism 159 with respect to the paper surface is a sixth surface 157f.

In the dichroic prism 157, the reflected distance measuring light and the reflected tracking light transmitted through the first surface 157a are internally reflected on the second surface 157b, the first surface 157a, a third surface 157c, the second surface 157b and the first surface 157a sequentially, and then enter the fourth surface 157d.

In the reflected distance measuring light and the reflected tracking light which have entered the fourth surface 157d, the reflected tracking light is transmitted through the fourth surface 157d and the sixth surface 157f, and received by the image pickup element 45. Further, the reflected distance measuring light is reflected on the fourth surface 157d, transmitted through the first surface 157, and received by the light receiving module 39.

The dichroic prism 157 is configured in such a manner that the reflected distance measuring light and the reflected tracking light are internally reflected in the dichroic prism 157 five times, and then separated by the fourth surface 157d. Therefore, the lengths in the optical axis direction of the distance measuring light receiving module 23 and the tracking light receiving module 25 can be further shortened.

Figure 15B:
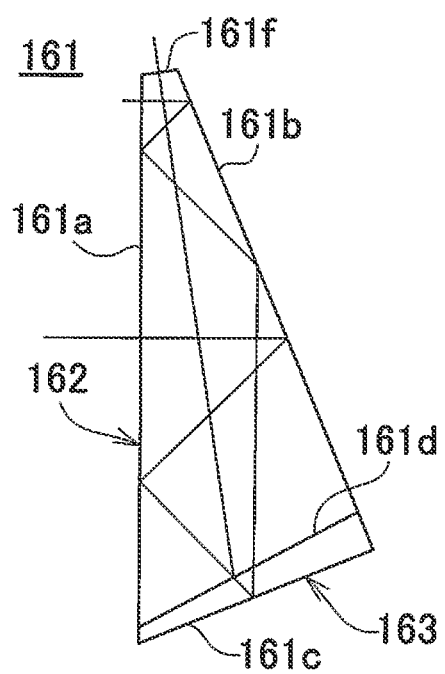

In a dichroic prism 161 shown in FIG. 15B, a third prisms 162 is attached to and integrated with a lower surface of a first prism 163. In the dichroic prism 161, a lower surface of the third prism 162 with respect to the paper surface is a third surface 161c, and a boundary surface of the first prism 163 and the third prism 162 is a fourth surface 161d as a separating surface. Further, an upper surface of the first prism 163 with respect to the paper surface is a sixth surface 161f.

The reflected distance measuring light and the reflected tracking light transmitted through the first surface 161a are internally reflected on the second surface 161b and the first surface 161a sequentially, and then enter the fourth surface 161d. The fourth surface 161d reflects the reflected distance measuring light and transmits through the reflected tracking light.

The reflected distance measuring light reflected on the fourth surface 161d is transmitted through the sixth surface 161f and enters the image pickup element 45. Further, the reflected tracking light transmitted through the fourth surface 161d is internally reflected on the third surface 161c, the second surface 161b, the first surface 161a and the second surface 161b sequentially, then transmitted through the first surface 161a, and received by the light receiving module 39.

The dichroic prism 161 is configured in such a manner that the reflected tracking light is internally reflected in the dichroic prism 161 six times. Therefore, the length in the optical axis direction of the tracking light receiving module 25 can be further shortened.

Figure 15C:
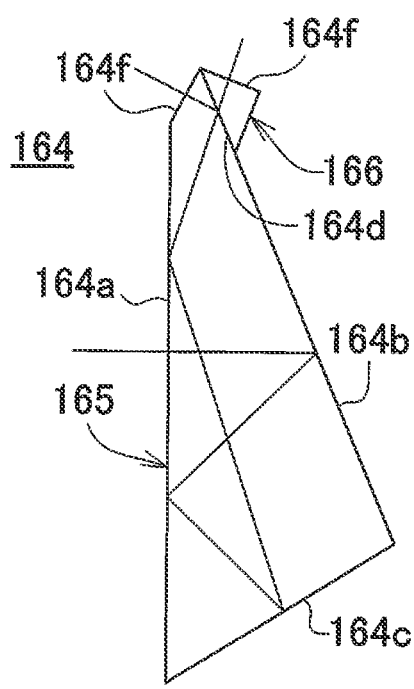

In a dichroic prism 164 shown in FIG. 15C, similar to the dichroic prism 157, a third prisms 166 is attached to and integrated with a second surface 164b of a first prism 165. Further, each of an upper surface of the third prism 166 with respect to the paper surface and an upper surface of the first prism 165 with respect to the paper surface is a sixth surface 164f having an antireflective film provided on the surface.

The reflected distance measuring light and the reflected tracking light transmitted through a first surface 164a and reflected on the second surface 164b are internally reflected on the first surface 164a, a third surface 164c and the first surface 164a sequentially, and enter a fourth surface 164d as a separating surface.

The fourth surface 164d reflects the reflected distance measuring light and transmits through the reflected tracking light. The reflected distance measuring light reflected on the fourth surface 164d is transmitted through the sixth surface 164f of the first prism 165, and received by the light receiving module 39. Further, the reflected tracking light transmitted through the fourth surface 164d is transmitted through the sixth surface 164f of the third prism 166, and received by the image pickup element 45.

Figure 15D:
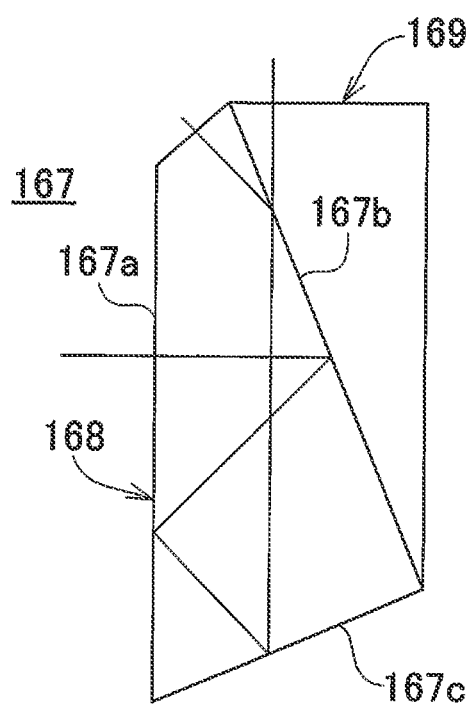

In a dichroic prism 167 shown in FIG. 15D, a third prisms 169 is attached to and integrated with a second surface 167b of a first prism 168. Further, a long pass filter is vapor-deposited on the second surface 167b, and the second surface 167b forms a long pass filter surface. The long pass filter has the optical characteristics which a reflectance increases when an incidence angle is small in a specific wavelength band and a transmittance increases when the incidence angle is large in the specific wavelength band.

Figure 16:
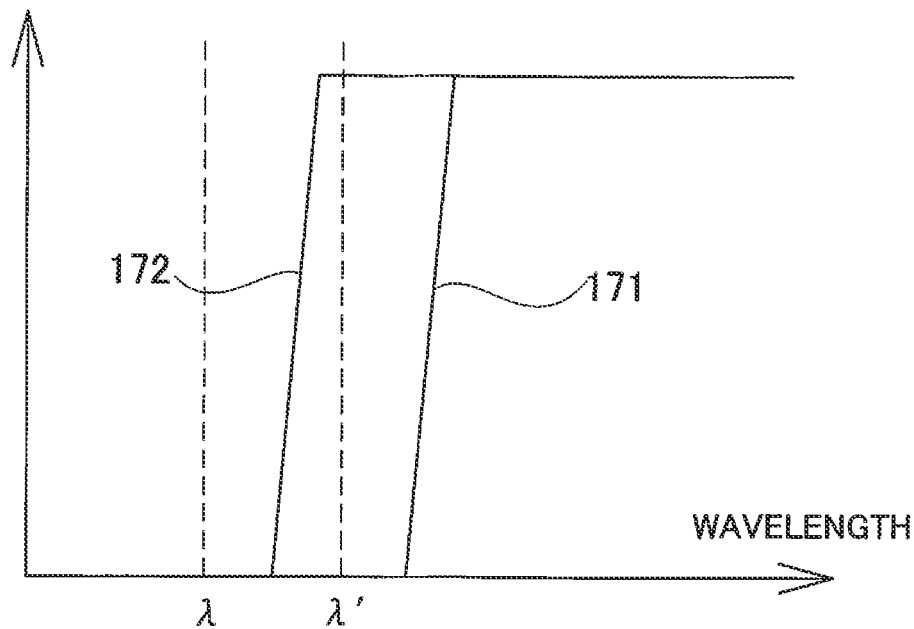
FIG. 16 is a graph showing a relationship between a wavelength and a transmittance for each incidence angle to a long pass filter.

FIG. 16 is a graph showing a relationship between a wavelength and a transmittance for each incidence angle with respect to the long pass filter. In FIG. 16, a graph on the right side shows the spectral characteristics 171 when the incidence angle is small, and a graph on the left side shows the spectral characteristics 172 when the incidence angle is large.

For instance, in a relationship of a wavelength $\lambda'>a$ wavelength $\lambda$, a wavelength of the distance measuring light is assumed to be $\lambda$ and a wavelength of the tracking light is assumed to be $\lambda'$. In this case, in a case where the incidence angle is small (the spectral characteristics 171), both the distance measuring light and the tracking light are reflected by the long pass filter. On the other hand, in a case where the incidence angle is large (the spectral characteristics 172), the distance measuring light is reflected by the long pass filter, and the tracking light is transmitted through the long pass filter.

In the dichroic prism 167, the reflected distance measuring light and the reflected tracking light transmitted through the first surface 167a enter the second surface 167b. An incidence angle of each of the reflected distance measuring light and reflected tracking light for first time with respect to the second surface 167b is small (the spectral characteristics 171). Therefore, both the reflected distance measuring light and the reflected tracking light are reflected on the second surface 167b.

The reflected distance measuring light and the reflected tracking light reflected on the second surface 167b are internally reflected on the first surface 167a and a third surface 167c sequentially, and then enter the second surface 167b. An incidence angle of each of the reflected distance measuring light and reflected tracking light for second time with respect to the second surface 167b is large (the spectral characteristics 172). Therefore, the reflected distance measuring light is reflected on the second surface 167b, and the reflected tracking light is transmitted through the second surface 167b.

In the dichroic prism 167, since the long pass filter is vapor-deposited on the second surface 167b, a function as a separating surface for separating the reflected distance measuring light from the reflected tracking light can be imparted with respect to the second surface 167b.

Figure 17A:
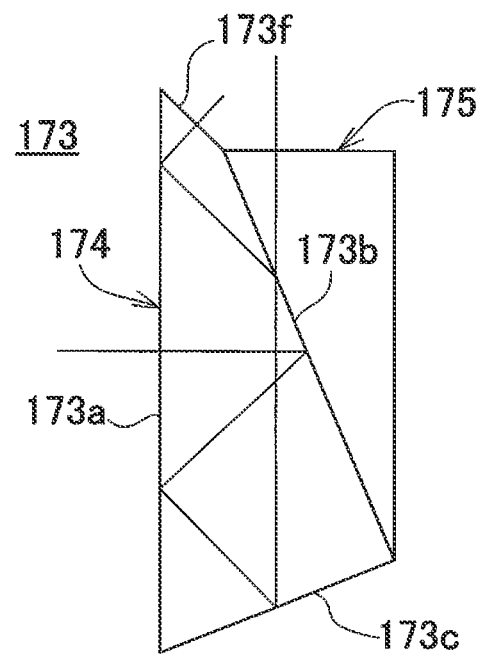
FIG. 17A and FIG. 17B are the block diagrams each showing a modification of the dichroic prism according to the fourth embodiment.

In a dichroic prism 173 shown in FIG. 17A, similar to the dichroic prism 167, a first prism 174 and a third prisms 175 are integrated via a second surface 173b. A long pass filter is vapor-deposited on the second surface 173b, the second surface 173b forms a long pass filter surface.

An incidence angle of the reflected distance measuring light and the reflected tracking light at the time of entering the second surface 173b for the first time is small. Therefore, both the reflected distance measuring light and the reflected tracking light are totally reflected. Further, an incidence angle of the reflected distance measuring light and the reflected tracking light at the time of entering the second surface 173b for the second time after being sequentially reflected on the first surface 173a and the third surface 173c is large. Therefore, the reflected tracking light is transmitted through the second surface 173b, and the reflected distance measuring light is reflected on the second surface 173b. That is, the second surface 173b also functions as a separating surface.

The reflected distance measuring light reflected on the second surface 173b is reflected on the first surface 173a, then transmitted through a sixth surface 173f, and received by the light receiving module 39.

Since the dichroic prism 173 is configured in such a manner that the reflected distance measuring light is internally reflected in the dichroic prism 173 five times. Therefore, the length in the optical axis direction of the distance measuring light receiving module 23 can be shortened, and the distance measuring light receiving module 23 can be miniaturized.

Figure 17B:
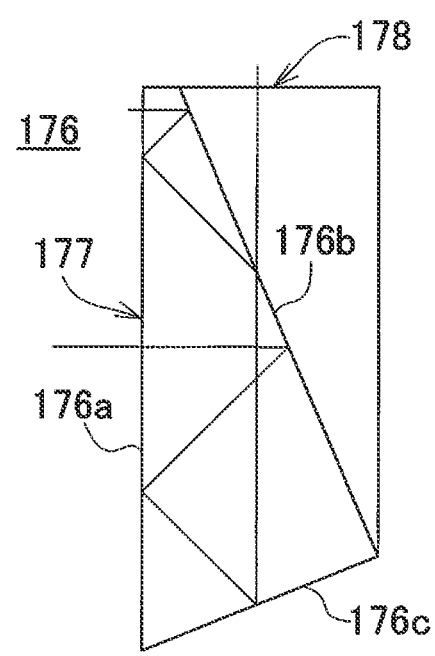

In a dichroic prism 176 shown in FIG. 17B, similar to the dichroic prism 167, a first prism 177 and a third prisms 178 are integrated via a second surface 176b. A long pass filter is vapor-deposited on the second surface 176b, the second surface 176b forms a long pass filter surface.

An incidence angle of the reflected distance measuring light and the reflected tracking light at the time of entering the second surface 176b for the first time after being transmitted through a first surface 176a is small. Therefore, both the reflected distance measuring light and the reflected tracking light are totally reflected. Further, an incidence angle of the reflected distance measuring light and the reflected tracking light at the time of entering the second surface 176b for the second time after being sequentially reflected on the first surface 176a and the third surface 176c is large. Therefore, the reflected tracking light is transmitted through the second surface 176b, and the reflected distance measuring light is reflected on the second surface 176*b*. That is, the second surface 176*b* also functions as a separating surface.

The reflected distance measuring light reflected on the second surface 176*b* is reflected on the first surface 176*a*, enters the second surface 176*b* at a small incidence angle. The reflected distance measuring light reflected on the second surface 176*b* transmits through the first surface 176*a*, and received by the light receiving module 39.

Since the dichroic prism 176 is configured in such a manner that the reflected distance measuring light is internally reflected in the dichroic prism 176 six times, the length in the optical axis direction of the distance measuring light receiving module 23 can be shortened, and the distance measuring light receiving module 23 can be miniaturized.

It is to be noted that, in FIG. 14A, FIG. 14B, FIG. 15A to FIG. 15D, FIG. 17A, and FIG. 17B, the distance measuring light receiving module 23 and the tracking light receiving module 25 may be replaced with each other.

Further, the fourth embodiment and the modifications may be combined with the second embodiment, and the color glass may be added. By adding the color glass, the dichroic prism can attenuate or eliminate the disturbance light of the reflected distance measuring light and the reflected tracking light and can improve a distance measurement accuracy and a tracking accuracy.

The invention claimed is:

1. A surveying instrument comprising a distance measuring unit which irradiates an object with the distance measuring light and measures a distance to said object based on the reflected distance measuring light from said object, wherein said distance measuring unit includes a distance measuring light projecting module configured to project said distance measuring light and a distance measuring light receiving module configured to receive said reflected distance measuring light, said distance measuring light receiving module includes a dichroic prism and a light receiving module, and said dichroic prism is configured in such a manner that said reflected distance measuring light is internally reflected in said dichroic prism at least three times and then received by said light receiving module, wherein said dichroic prism is further configured in such a manner that, after having been three time internally reflected in said dichroic prism, said reflected distance measuring light interests with an optical axis of said reflected distance measuring light which entered the dichroic prism and also intersects with an optical axis of said reflected distance measuring light which was internally reflected for a first time.

2. The surveying instrument according to claim 1, wherein said distance measuring unit further includes a sighting module configured to sight said object, wherein said dichroic prism is configured to separate the visible light or the visible light excluding a part of a red color which has entered coaxially with said reflected distance measuring light.

3. The surveying instrument according to claim 1, wherein said distance measuring unit further includes a tracking light projecting module configured to project the tracking light to said object and a tracking light receiving module configured to receive the reflected tracking light from said object, wherein said dichroic prism is configured in such a manner that said reflected distance measuring light and said reflected tracking light are internally reflected in said dichroic prism at least three times respectively and then said reflected distance measuring light is separated from said reflected tracking light.

4. The surveying instrument according to claim 2, wherein said dichroic prism having a surface configured to separate said visible light or said visible light excluding a part of said red color.

5. The surveying instrument according to claim 3, wherein said dichroic prism includes a first prism configured to internally reflect said reflected distance measuring light and said reflected tracking light and a third prism having a separating surface configured to separate said reflected distance measuring light from said reflected tracking light.

6. The surveying instrument according to claim 5, wherein said separating surface is a dichroic filter surface configured to transmit through any one of said reflected distance measuring light and said reflected tracking light and reflects the other light.

7. The surveying instrument according to claim 5, wherein said separating surface is a long pass filter surface configured to change a reflectance based on an incidence angle.

8. The surveying instrument according to claim 3, wherein said dichroic prism further includes a color glass provided on an optical path of at least one of said reflected distance measuring light and said reflected tracking light.

9. The surveying instrument according to claim 2, wherein said distance measuring unit further includes a tracking light projecting module configured to project the tracking light to said object and a tracking light receiving module configured to receive the reflected tracking light from said object, wherein said dichroic prisms is configured in such a manner that said reflected distance measuring light and said reflected tracking light are internally reflected in said dichroic prism at least three times respectively and then said reflected distance measuring light is separated from said reflected tracking light.

10. The surveying instrument according to claim 9, wherein said dichroic prism includes a first prism configured to internally reflect said reflected distance measuring light and said reflected tracking light and a third prism having a separating surface configured to separate said reflected distance measuring light from said reflected tracking light.

11. The surveying instrument according to claim 10, wherein said separating surface is a dichroic filter surface configured to transmit through any one of said reflected distance measuring light and said reflected tracking light and reflects the other light.

12. The surveying instrument according to claim 10, wherein said separating surface is a long pass filter surface configured to change a reflectance based on an incidence angle.

13. The surveying instrument according to claim 5, wherein said dichroic prism further includes a color glass provided on an optical path of at least one of said reflected distance measuring light and said reflected tracking light.

14. The surveying instrument according to claim 6, wherein said dichroic prism further includes a color glass provided on an optical path of at least one of said reflected distance measuring light and said reflected tracking light.

15. The surveying instrument according to claim 7, wherein said dichroic prism further includes a color glass provided on an optical path of at least one of said reflected distance measuring light and said reflected tracking light.

16. The surveying instrument according to claim 9, wherein said dichroic prism further includes a color glass provided on an optical path of at least one of said reflected distance measuring light and said reflected tracking light.

17. The surveying instrument according to claim 10, wherein said dichroic prism further includes a color glass provided on an optical path of at least one of said reflected distance measuring light and said reflected tracking light.

18. The surveying instrument according to claim 11, wherein said dichroic prism further includes a color glass provided on an optical path of at least one of said reflected distance measuring light and said reflected tracking light.

19. The surveying instrument according to claim 12, wherein said dichroic prism further includes a color glass provided on an optical path of at least one of said reflected distance measuring light and said reflected tracking light.

\* \* \* \* \*